(12) United States Patent
Pizlo et al.

(10) Patent No.: US 11,016,743 B2
(45) Date of Patent: May 25, 2021

(54) RUNTIME STATE BASED CODE RE-OPTIMIZATION

(71) Applicant: Apple Inc., Cupertino, CA (US)

(72) Inventors: Filip J. Pizlo, Capitola, CA (US); Gavin Barraclough, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/073,500

(22) Filed: Mar. 17, 2016

(65) Prior Publication Data

US 2016/0321046 A1 Nov. 3, 2016

Related U.S. Application Data

(63) Continuation of application No. 13/593,417, filed on Aug. 23, 2012, now abandoned.

(60) Provisional application No. 61/681,530, filed on Aug. 9, 2012.

(51) Int. Cl.
*G06F 8/41* (2018.01)
*G06F 11/34* (2006.01)
*G06F 8/30* (2018.01)

(52) U.S. Cl.
CPC .......... *G06F 8/443* (2013.01); *G06F 11/3452* (2013.01); *G06F 11/3466* (2013.01); *G06F 8/31* (2013.01); *G06F 8/315* (2013.01); *G06F 8/437* (2013.01); *G06F 11/3409* (2013.01); *G06F 2201/865* (2013.01); *G06F 2201/88* (2013.01)

(58) Field of Classification Search
CPC .. G06F 8/437; G06F 9/45504; G06F 9/45525; G06F 11/0718; G06F 12/0253; G06F 12/0261; G06F 12/0269
See application file for complete search history.

(56) References Cited

U.S. PATENT DOCUMENTS

| | | |
|---|---|---|
| 5,909,578 A | 6/1999 | Buzbee |
| 5,940,621 A | 8/1999 | Caldwell |
| 6,077,313 A | 6/2000 | Ruf |
| 6,151,706 A | 11/2000 | Lo et al. |
| 6,202,202 B1 | 3/2001 | Steensgaard |

(Continued)

OTHER PUBLICATIONS

Haupt, Michael et al. "Type harvesting: a practical approach to obtaining typing information in dynamic programming languages." Mar. 21, 2011. Proceedings of the 2011 ACM Symposium on Applied Computing. ACM.*

(Continued)

*Primary Examiner* — Lewis A Bullock, Jr.
*Assistant Examiner* — Gilles R Kepnang
(74) *Attorney, Agent, or Firm* — Womble Bond Dickinson (US) LLP

(57) ABSTRACT

A method and an apparatus to execute a code compiled from a source code to access an untyped variable are described. An optimized access code may be compiled in the code with speculative optimization via a type prediction of runtime value of the untyped variable. Invalidity of the type prediction may be dynamically detected for future runtime values of the untyped variable. The code may be updated with an access code compiled for the access without the speculative optimization based on the invalidity detection. The updated code can be executed for the access to the untyped variable without executing the optimized access code.

28 Claims, 14 Drawing Sheets

(56) References Cited

U.S. PATENT DOCUMENTS

| | | | |
|---|---|---|---|
| 6,263,495 B1 | 7/2001 | Kataoka | |
| 6,442,751 B1* | 8/2002 | Cocchi | G06F 8/437 |
| | | | 707/999.202 |
| 6,446,257 B1 | 9/2002 | Pradhan et al. | |
| 6,463,582 B1 | 10/2002 | Lethin et al. | |
| 6,629,113 B1 | 9/2003 | Lawrence | |
| 6,631,514 B1 | 10/2003 | Le | |
| 6,763,440 B1 | 7/2004 | Traversat et al. | |
| 6,865,657 B1 | 3/2005 | Traversat et al. | |
| 6,874,074 B1 | 3/2005 | Burton et al. | |
| 6,954,923 B1 | 10/2005 | Yates et al. | |
| 6,983,458 B1 | 1/2006 | Honda | |
| 7,103,723 B2 | 9/2006 | Cierniak | |
| 7,137,123 B2 | 11/2006 | Bak et al. | |
| 7,228,532 B1 | 6/2007 | Shaylor et al. | |
| 7,272,828 B2 | 9/2007 | Wu et al. | |
| 7,412,696 B2 | 8/2008 | Matsuyama | |
| 7,493,610 B1 | 2/2009 | Onodera et al. | |
| 7,620,943 B1 | 11/2009 | Garthwaite | |
| 7,650,464 B2 | 1/2010 | Liu et al. | |
| 7,725,883 B1 | 5/2010 | Nylander et al. | |
| 7,770,163 B2 | 8/2010 | Stoodley et al. | |
| 7,873,592 B2 | 1/2011 | Meijer et al. | |
| 7,912,877 B2 | 3/2011 | Shankar et al. | |
| 7,962,901 B2 | 6/2011 | McCamant | |
| 8,176,286 B2* | 5/2012 | Nevill | G06F 12/0253 |
| | | | 707/816 |
| 8,200,718 B2 | 6/2012 | Roberts | |
| 8,214,808 B2 | 7/2012 | Day et al. | |
| 8,244,775 B1 | 8/2012 | Bak et al. | |
| 8,341,602 B2 | 12/2012 | Hawblitzel et al. | |
| 8,392,881 B1 | 3/2013 | Lund | |
| 8,543,987 B2 | 9/2013 | Chapman et al. | |
| 8,566,944 B2* | 10/2013 | Peinado | G06F 21/566 |
| | | | 711/154 |
| 2002/0120428 A1 | 8/2002 | Christiaens | |
| 2002/0129343 A1 | 9/2002 | Pinter et al. | |
| 2002/0138506 A1* | 9/2002 | Shuf | G06F 12/0269 |
| 2002/0170043 A1 | 11/2002 | Bagley et al. | |
| 2003/0023959 A1 | 1/2003 | Park | |
| 2003/0093778 A1 | 5/2003 | Bak et al. | |
| 2003/0126590 A1 | 7/2003 | Burrows et al. | |
| 2003/0131347 A1 | 7/2003 | Allison | |
| 2003/0196196 A1* | 10/2003 | Nylander | G06F 8/41 |
| | | | 717/159 |
| 2004/0003382 A1 | 1/2004 | Steensgaard | |
| 2004/0060041 A1 | 3/2004 | Demsey et al. | |
| 2004/0093589 A1 | 5/2004 | Master | |
| 2004/0128446 A1 | 7/2004 | Dulong | |
| 2004/0193828 A1* | 9/2004 | Nevill | G06F 12/0253 |
| | | | 711/170 |
| 2004/0268328 A1 | 12/2004 | Plesko et al. | |
| 2005/0015748 A1 | 1/2005 | Zatloukal | |
| 2005/0055680 A1 | 3/2005 | Kluger et al. | |
| 2005/0091648 A1 | 4/2005 | Dick et al. | |
| 2005/0102657 A1* | 5/2005 | Lewis | G06F 9/45516 |
| | | | 717/140 |
| 2005/0138329 A1* | 6/2005 | Subramoney | G06F 12/0253 |
| | | | 712/207 |
| 2005/0223363 A1 | 10/2005 | Black-Ziegelbein et al. | |
| 2006/0085460 A1 | 4/2006 | Peschel-Gallee et al. | |
| 2006/0265438 A1* | 11/2006 | Shankar | G06F 11/0718 |
| 2007/0043531 A1 | 2/2007 | Kosche et al. | |
| 2007/0043760 A1 | 2/2007 | Johannes Maria Meijer et al. | |
| 2007/0162896 A1 | 7/2007 | Geva et al. | |
| 2007/0234288 A1* | 10/2007 | Lindsey | G06F 8/437 |
| | | | 717/117 |
| 2008/0005208 A1 | 1/2008 | Vaswani et al. | |
| 2008/0178149 A1 | 7/2008 | Peterson et al. | |
| 2008/0189888 A1 | 8/2008 | Schmidt | |
| 2008/0320453 A1* | 12/2008 | Meijer | G06F 8/423 |
| | | | 717/140 |
| 2009/0083509 A1 | 3/2009 | Johnson | |
| 2009/0307292 A1 | 12/2009 | Li et al. | |
| 2010/0088679 A1 | 4/2010 | Langworthy et al. | |
| 2011/0246962 A1 | 10/2011 | Meijer et al. | |
| 2011/0265182 A1* | 10/2011 | Peinado | G06F 21/554 |
| | | | 726/24 |
| 2011/0314459 A1* | 12/2011 | Husbands | G06F 8/437 |
| | | | 717/151 |
| 2012/0005660 A1* | 1/2012 | Goetz | G06F 8/437 |
| | | | 717/140 |
| 2012/0030653 A1 | 2/2012 | Porras et al. | |
| 2012/0030661 A1* | 2/2012 | Porras | G06F 9/45525 |
| | | | 717/153 |
| 2012/0054725 A1 | 3/2012 | Inglis et al. | |
| 2012/0117549 A1 | 5/2012 | Doyle et al. | |
| 2012/0124560 A1 | 5/2012 | Indukuru et al. | |
| 2012/0158801 A1* | 6/2012 | Devegowda | G06F 12/0261 |
| | | | 707/816 |
| 2012/0216077 A1 | 8/2012 | Christensen et al. | |
| 2013/0031536 A1 | 1/2013 | De et al. | |
| 2013/0067441 A1 | 3/2013 | Lafreniere et al. | |
| 2013/0074052 A1* | 3/2013 | Adams | G06F 8/443 |
| | | | 717/140 |
| 2013/0091337 A1* | 4/2013 | Schmich | G06F 11/3471 |
| | | | 711/171 |
| 2013/0125101 A1* | 5/2013 | Pamer | G06F 8/437 |
| | | | 717/141 |
| 2013/0205282 A1* | 8/2013 | Lafreniere | G06F 9/45504 |
| | | | 717/139 |
| 2013/0325904 A1 | 12/2013 | Clifford et al. | |
| 2013/0339936 A1 | 12/2013 | Boulos | |
| 2014/0040860 A1* | 2/2014 | Darcy | G06F 8/437 |
| | | | 717/114 |
| 2014/0047418 A1* | 2/2014 | Bryan | G06F 9/449 |
| | | | 717/136 |
| 2014/0053143 A1* | 2/2014 | Conrod | G06F 8/443 |
| | | | 717/148 |
| 2014/0173556 A1* | 6/2014 | Robatmili | G06F 8/31 |
| | | | 717/115 |

OTHER PUBLICATIONS

Shankar, Ajeet et al. "Runtime specialization with optimistic heap analysis." Oct. 17, 2005. ACM SIGPLAN Notices. vol. 40. No. 10.*

Bugliesi, et al., "Type Inference for Variant Object Types," Information and Computation 177, 2·27 (2002) pp. 2-27 (26 pgs.)

Bartlett, Joel F., "Compacting Garbage Collection with Ambiguous Roots," Western Research Laboratory, Palo Alto, California, USA, Feb. 1988 (41 pgs.)

Bartlett, Joel F., WRL Technical Note TN-12, "Mostly-Copying Garbage Collection Picks Up Generations and C++" Western Research Laboratory, Palo Alto, California, USA Oct. 1989 (20 pgs.)

Cheney, C. J., "A Nonrecursive List Compacting Algorithm" Communications of the ACM, vol. 13, No. 11, Nov. 1970, pp. 677-678 (2 pgs.)

Yip, G. May, WRL Research Report 91/8, "Incremental Generational Mostly-Copying Garbage Collection in Uncooperative Environments," Western Research Laboratory, Palo Alto, California, USA, Jun. 1991, pp. 1-114, (118 pgs.)

Haupt, Michael et al., "Type Harvesting," ACM, SAC'11, Mar. 21-25, 2011, TaiChung, Taiwan.

Chillmbi, Trishul M. et al., "Low-Overhead Memory Leak Detection Using Adaptive Statistical Profiling," ACM, ASPLOS'04, Oct. 9-13, 2004, Boston, MA, USA.

Holzie, Urs et al., "Optimizing Dynamically-Dispatched Calls with Run-Time Type Feedback," ACM, SIGPLAN'94 Jun. 1994, Orlando, FL, USA.

PCT International Search Report and Written Opinion of the International Searching Authority for PCT/US2013/051116 dated Nov. 7, 2013.

Arnold, Matthew, et al. "Dynamic Compilation and Adaptive Optimization in Virtual Machines", 2006, IBM Corporation.

* cited by examiner

700

Collecting a runtime history for a sequence of executions, each execution to perform a data processing task specified in a source code, each execution based on a code compiled from the source code, and each execution followed by a next one of the executions in the sequence, the runtime history includes a number of invocations of the data processing task for each execution 701

↓

Configuring dynamically a setting for each execution, the setting specifying a condition to initiate the next execution 703

↓

Recompiling a compiled code from the source code for the next execution if the runtime history matches the condition, the compiled code optimized based on the runtime history, the number of invocations of the data processing tasks for each execution increasing following the sequence 705

```
Executing a code compiled from a source code including an access of an untyped variable, the access
being compiled with speculative optimization as an optimized access code in the code via a type
prediction of runtime values of the untyped variable  801
```
↓
```
Detecting dynamically invalidity of the type prediction for future runtime values of the untyped variable
803
```
↓
```
Updating the code with an access code compiled for the access without the speculative optimization 805
```
↓
```
Executing the updated code without executing the optimized access code for the future runtime values of
the untyped variable 807
```

Maintaining a plurality of first structures and a plurality of second structures separately in a first portion and a second portion of a heap in a memory to execute a code based on the heap, wherein each second structure is referenced by at most one of the first structure, at least one of the first structures representing an object created via the execution of the code, the object having a dynamic property associated with at least one of the second structures, the code is linked with a particular code capable of referencing the dynamic property of the object without referencing the first structure representing the object 1101

Performing non-moving garbage collection operations on the first portion of the heap to identify which of the first structures are available for future allocation from the first portion of the heap without moving the identified first structures 1103

Performing moving garbage collection operations on the second portion of the heap to identify which of the second structures are movable within the second portion of the heap for future allocation from the second portion of the heap, the non-moving garbage collection operations and the moving garbage collection operations are performed substantially in parallel, a particular one of the second structures is not movable if the particular second structure is referenced by the particular code, and the identified movable second structures are moved within the second portion of the heap for future allocation from the second portion of the heap 1111

Scanning a stack used in executing a code compiled from a dynamic programming language based source code, the stack including one or more references to a heap including one or more first memory blocks and one or more second memory blocks, the first memory blocks allocated with fixed sized slots, the second memory blocks allocated with varied sized slots, two or more of the fixed sized slot being related via a hierarchical relationship, each varied sized slot being referenced by at most one of the fixed sized slots 1201

Identifying which of the fixed sized slots are live (or live fixed sized slots), each fixed sized slot referenced by the references in the stack is live, each fixed sized slot referenced (e.g. via a pointer or based on a hierarchical relationship) by a live fixed sized slot is also live 1203

Identifying which of the varied sized slots are live, each varied sized slot referenced by live fixed size slot is live 1205

Identifying pinned portion of the second memory blocks according to the references of the stack, each varied sized slot referenced by the references belongs to the pinned portion of the second memory blocks 1207

Copying the live varied sized slots which are not in the pinned portion of the second memory blocks to make room for future allocation 1209

Defragmenting the first memory blocks in the heap to reclaim one or more of the fixed sized slots which are not live without moving the fixed sized slots 1211

Defragmenting the second memory blocks in the heap to reclaim one or more of the varied sized slots which are neither live nor pinned (or in the pinned portion of the second memory blocks) 1213

Fig. 12

RUNTIME STATE BASED CODE RE-OPTIMIZATION

CROSS-REFERENCE TO RELATED APPLICATIONS

This application is a continuation of co-pending U.S. patent application Ser. No. 13/593,417 filed on Aug. 23, 2012, which is related to, and claims the benefits of U.S. Provisional Patent Application No. 61/681,530, filed Aug. 9, 2012, entitled "DYNAMIC CODE OPTIMIZATION", by Filip Pizlo et al., which is hereby incorporated by reference herein in its entirety.

FIELD OF INVENTION

The present invention relates generally to optimized runtime compilation. More particularly, this invention relates to timely re-optimization of dynamic language based code based on runtime state.

BACKGROUND

Dynamic languages that lack type annotations of any kind are increasingly popular. For example, JavaScript has become the *lingua* franca of the World Wide Web, while Ruby, Python, Perl, and PHP have become standard languages for server-side infrastructure. However, runtime of dynamic language based code may require significant overhead to execute.

For example, lack of type information may prohibit optimal compilation to avoid dynamic type conversion for a variable. Runtime profiling has been adopted to provide additional type information to improve execution performance. Typical runtime profiling, however, relies on recording types of values encountered and requires complicated data structures and extensive profiling operations. As a result, effectiveness of the compilation is adversely affected for overall performance improvement.

Further, when current runtime values encountered no longer match the previous profiling results, optimally compiled code based on the previous profiling results may cost more processing cycles to execute than a corresponding non-optimally compiled code. Such discrepancies between current runtime values and previous profiling results can severely tax execution performance.

Furthermore, dynamically typed code may be linked with an external library already compiled from non-dynamically typed language based source code. An interface layer is usually created in the dynamically typed code to allow the external library to access data owned by the dynamically typed based code. As a result, runtime performance may be degraded with the overhead incurred by data loading/updating through the interface layer.

Therefore, existing runtime compilation and execution for dynamically typed code tends to introduce performance cost which may be unnecessary, wasteful and avoidable.

SUMMARY OF THE DESCRIPTION

Recompilation of an executable code can be invoked once invalidity of a prediction for code optimization is identified based on runtime data and function blocks specified in the code without waiting for infrequent profiling analysis to recognize repeated failure of the prediction. The executable code may include instructions optimized (e.g. optimizing code) based on the prediction. A function block when executed (e.g. via a function call) with source types of runtime values may cause structure transitions to transition or generate destination types of runtime values. In one embodiment, a garbage collector can have access to runtime data and the function blocks to determine whether a prediction is not longer valid (e.g. for current and future runtime data). Possible types of runtime values (e.g. object structures) can be transitively inferred or derived based on the current runtime data and structure transitions corresponding to the function blocks in the code for determining the validity of a prediction.

In one embodiment, a code compiled from a source code can be executed to access an untyped variable. An optimized access code may be compiled in the code with speculative optimization via a type prediction of runtime values of the untyped variable. Invalidity of the type prediction may be dynamically detected for future runtime values of the untyped variable. The code may be updated with an access code compiled for the access without the speculative optimization based on the invalidity detection. The updated code can be executed for the access to the untyped variable without executing the optimized access code.

In another embodiment, a code compiled from a source code specifying at least one function may be executed to call the function with an untyped input variable. The code may include a first function code optimally compiled for the function based on a type prediction for future runtime values of the untyped input variable. Invalidity of the type prediction for the future runtime values of the untyped variable may be dynamically detected. On detection of the invalidity, the code may be dynamically updated with a second function code compiled for the function. The updated code may be executed without executing the first function code for the future runtime values of the untyped input variable.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 is a flow diagram illustrating one embodiment of a process to dynamically recompile code optimized based on runtime history;

FIG. 8 is a flow diagram illustrating one embodiment of a process to detect invalidity of type prediction to update an optimized code;

FIG. 11 is a flow diagram illustrating one embodiment of a process for performing moving and non-moving garbage collections concurrently on separate portions of a heap;

FIG. 12 is a flow diagram illustrating one embodiment of a process to scan a stack to identify live memory slots and pinned memory slots to reclaim memory slots which are not live and not pinned by moving the live memory slots without moving the pinned memory slots;

DETAILED DESCRIPTION

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
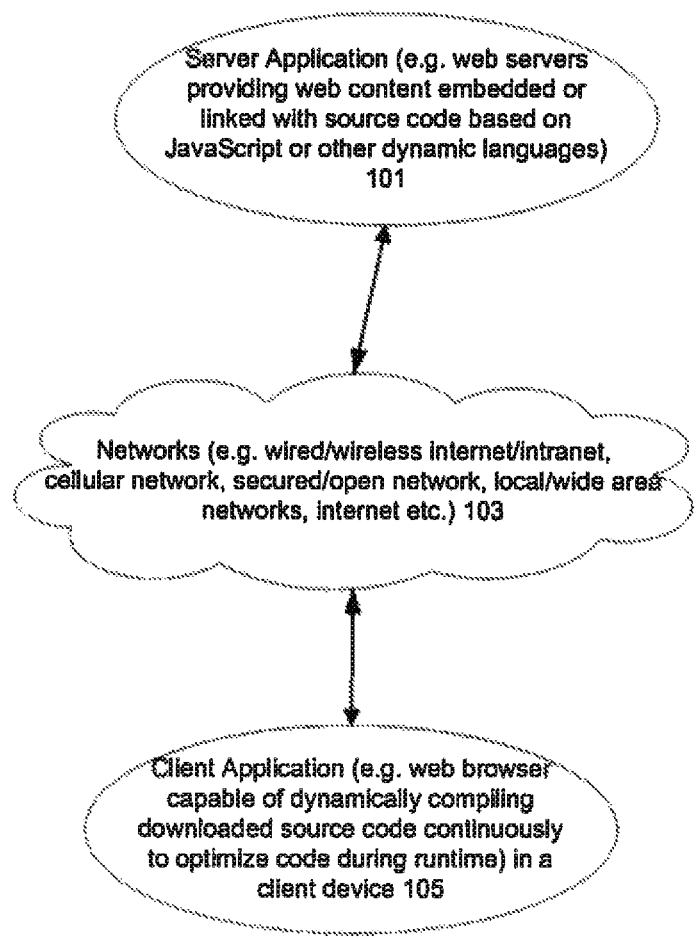
FIG. 1 is a network diagram illustrating an exemplary runtime optimization for source code retrieved from networked devices.

FIG. 1 is a network diagram illustrating an exemplary runtime optimization for source code retrieved from networked devices. In one embodiment, network system 100 may include one or more server applications, such as server application 101, hosted in one or more server devices to provide content available for client application 105 running in a client device. For example, server application 101 may be a web server and client application 105 may be a web browser. Server 101 and client 105 may communicate with each other via network 103 based on, for example, internet protocols such as HTTP (Hypertext Transport Protocol) or other applicable protocols.

In one embodiment, content retrieved from server 101 may include web pages based on hypertext languages, such as HTML (Hypertext Markup Language) or other markup language, embedded or linked (e.g. hyperlinked) with sources in a dynamic programming language, such as JavaScript. Client 105 may dynamically download or fetch the linked sources for execution. In one embodiment, client 105 may dynamically and/or continuously compile the downloaded sources to optimize code during runtime to improve execution performance.

Figure 2:
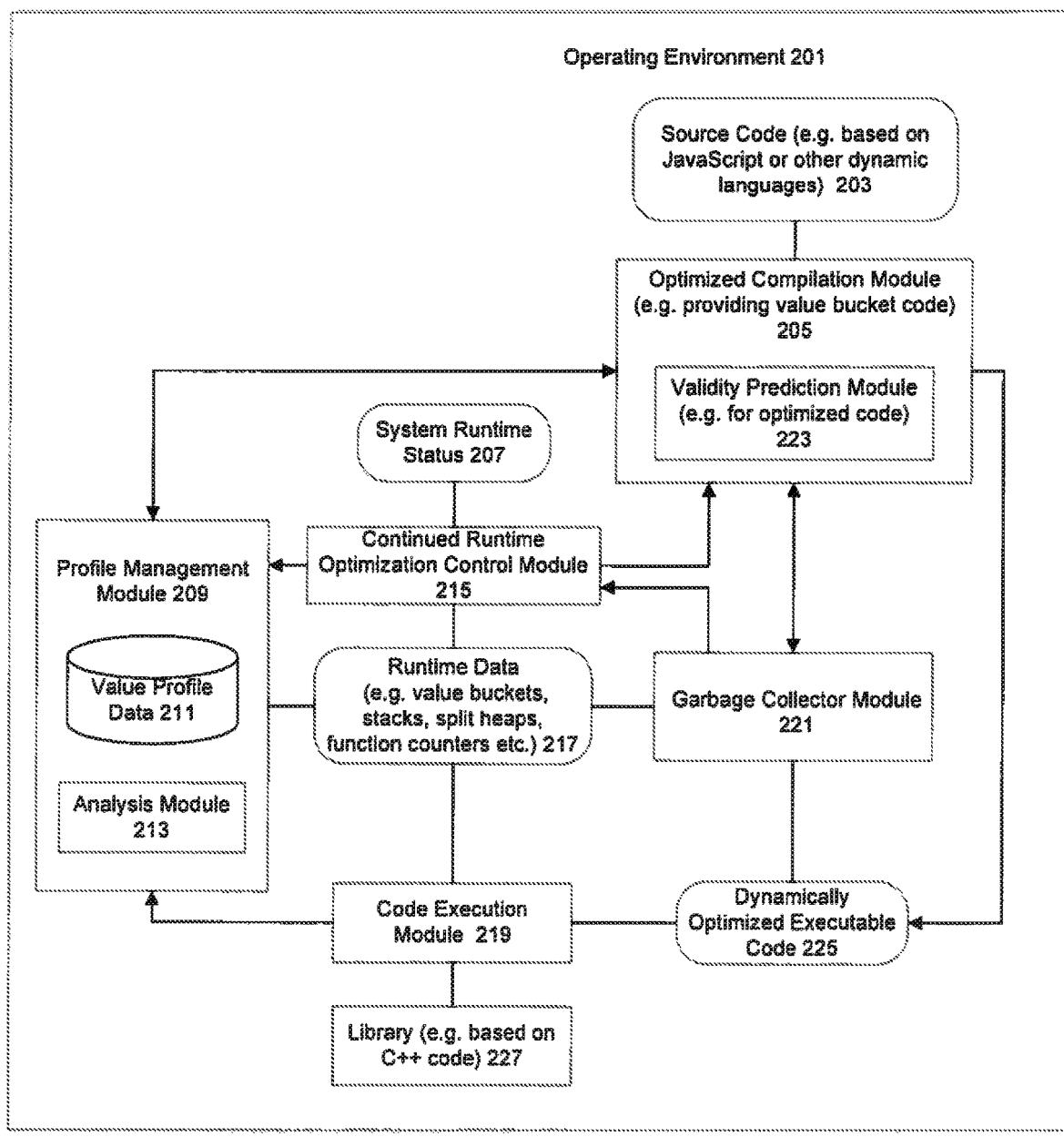
FIG. 2 is a block diagram illustrating one embodiment of a system for runtime optimization for dynamic programming languages.

FIG. 2 is a block diagram illustrating one embodiment of a system for runtime optimization for dynamic programming languages. In one embodiment, system 200 may include operating environment 201, such as an operating system hosting client application 105 of FIG. 1. Operating environment 201 may include optimized compilation module 205 dynamically and/or continuously compiling source code 203 into dynamically optimized executable code 225.

Source code 203 may comprise programs in a dynamic programming language, such as JavaScript. In one embodiment, source code 203 may be retrieved from a remote device, such as server 101 of FIG. 1, by a browser application running in operating environment 201. Compilation module 205 may be controlled by the browser application to perform browsing operations.

For example, compilation module 205 may insert profiling code in executable code 225 to collect runtime values into corresponding value buckets (or dedicated storage locations) allocated, for example, in runtime data 217. Profiling code may include value bucket code to update the runtime values to the corresponding value buckets when executed via execution module 219. Value buckets may be accessible by profile management module 209.

Code execution module 219 based on executable code 225 and profile management module 209 may belong to separate processes in operating environment 201. Optionally or additionally, profiling code may include, for example, function counters counting number of times a function in source code 203 has been called or executed.

In some embodiments, profile management module 209 may include value profile data 211 storing profiles of values established for untyped variables. For example, profile management module 209 can sample or collect (e.g. infrequently) current (or last) runtime values from value buckets of runtime data 217 into value profile data 211. Profile management module 209 and execution module 219 may run asynchronously in operating environment 201.

Profile management module 209 may include analysis module 213 to perform in-depth analysis on runtime variables (e.g. of executable code 225) using value profile data 211 and/or runtime data 217. Analysis module 213 may be activated, for example, periodically and/or in response to triggering events. Compilation module 205 may send triggering events to analyze value profiles for untyped variables via analysis module 213. For example, a triggering event for analysis module 213 may be based on an execution duration of executable code 225 (e.g. since last time analysis 213 was activated). In some embodiments, analysis module 213 run infrequently without causing performance impacts on execution module 219 or system 200.

In some embodiments, executable code 225 can include optimized code based on a type prediction for a function or an untyped variable. Additionally or optionally, executable code 225 may include failure handling code executed when the type prediction fails. The type prediction can fail, for example, if it is not consistent with current runtime values encountered in execution module 219. As a result, for example, execution module 219 may send requests (or triggers) to analysis module 213 for performing failure analysis.

Continued runtime optimization control module 215 can monitor execution status, including, for example, runtime data 217, value profile data 211, and/or system runtime status 207, to dynamically activate compilation module 205 to allow optimizing executable code 225 multiple times (e.g. iteratively or continuously) during runtime executing executable code 225. System runtime status 207 may include overall system wide resource or environmental information related to execution of execution module 219 in system 200, such as total physical memory size, currently available memory size, or other applicable parameters.

In one embodiment, control module 215 can determine whether certain conditions are satisfied to re-compile optimized executable code 225 according to the execution status. For example, control module 215 may detect that excessive number of failures of a type prediction in an optimized code (e.g. compared with number of function calls) have occurred to trigger re-compilation. Executable code 225 can be further updated or optimized using failure information gathered or analyzed via profile management module 209.

In certain embodiments, source code 203 may be based on dynamic programming language requiring garbage collector module 221 to manage runtime memory, such as runtime data 217 for execution module 219. Garbage collector module 221 may callback to compilation module 205 to determine whether a type prediction may fail for future runtime values. If the type prediction is expected to fail, the optimized code associated with the type prediction may be invalidated in executable code 225. For example, validity prediction module 223 may query garbage collector module 221 whether predicted types of values are possible in the future based on existing types of current runtime values in runtime data 217 and possible types created or transitioned via functions in executable code 225.

Garbage collector module 221 may provide information as early warnings for validity prediction module 223 to identify which type predictions used in optimized executable code 225 are likely to fail. As a result, compilation module 205 may preemptively re-compile or update executable code 225 without waiting for detection of actual failures of optimized code via control module 215. Validity prediction module 221 may allow removing optimized code associated with type predictions identified as no longer valid before occurrences of actual failures when executing the optimized code.

In one embodiment, executable code 225 may be linked to invoke library 227 which may be based on non-dynamically typed language such as C++, C or other applicable programming language. Library 227 may include its own memory management module to manage memory allocated in runtime data 217. In certain embodiments, runtime data 217 may include multiple portions of memory heap (e.g. split heap) to allow library 217 to directly access dynamic or varied sized property data created via execution module 219. Garbage collection module 221 may perform coordinated moving and non-moving garbage collection operations separately different portions of the split heap in runtime data 217. Unused memory allocations may be reclaimed while maintaining the efficiency of direct accessing of dynamic properties of untyped variables from library 227 (e.g. without creating interface objects managed by garbage collector 221 between execution module 219 and library 227).

Value Profiling for Code Optimization

In one embodiment, types of runtime values for variables in a program or executable code (e.g. based on dynamically typed programming languages) are identified and profiled (e.g. analyzed, summarized, etc.) during runtime while the program is running. Based on the identified types through past execution history, future types of runtime values may be predicted to update or recompile the program to replace portions of the program or code taking advantage of the type predictions.

For example, a JavaScript object allocated during runtime of a JavaScript executable code may represent a value for a JavaScript variable (e.g. dynamically typed). A JavaScript variable may contain a reference to an allocated object. Alternatively, a JavaScript variable may contain a value in-place, such as number, true, false, null, and undefined. Numbers may be represented as Int32 or Double, or any IntX for any other value of X bits. The JavaScript object may be a plain JavaScript object which can correspond to a function, an array of other JavaScript objects, a string, a typed array of Int8 (8 bit integer), Int16 (16 bit integer), Int32 (32 bit integer), Int64 (64 bit integer), unsigned integers of any of the previous sizes, Float32 (32 bit floating point number), Float64 (64 bit floating point number), dynamically created types or other applicable types. Without a prior knowledge of a scope of different types of runtime values to be encountered for an untyped variable, comprehensive type handlers may be required to cover large number of possible types of runtime values. Comprehensive type handlers may include baseline instructions with a large number of load and branch instructions requiring expensive processing cycles to execute.

In one embodiment, an optimized compiler can update a previously compiled code (e.g. an original executable code compiled from a source code without using runtime information) based on runtime profiles established when executing the previously compiled code. The runtime profiles may be dynamically collected and analyzed (e.g. infrequently and asynchronously to the execution of the previously compiled code) to uncover optimization opportunities, such as type predictions of future runtime values for untyped variables.

A type prediction for a variable may be employed, for example, to reduce the number of handlers covering a reduced scope of possible types of future runtime values expected to be encountered for an untyped variable in an updated compiled code. A dynamic compiler may optimize (or re-compile) a previously compiled code based on identified opportunities (e.g. type predictions) from execution profiling.

In one embodiment, type knowledge obtained via type predictions may be cascaded down to subsequent operations on a variable. For example, considering a source code for a function (e.g. in a dynamically typed language)

```
function foo (a, b) {
    var x = a + b; //statement #1
    var y = a - b; // statement #2
    return x * y; // statement #3
}
```

Given the profiled type knowledge the both input variables a, b are integers and results produced via function foo are also integer, the compiled code for function foo may be emitted to specialize on integers as (e.g. in pseudo code format):

```
if ( a is not integer)
    fall back
if ( b is not integer)
    fall back
x = int_add(a, b) and fall back if result is not integer
y = int_subtract(a, b) and fall back if result is not integer
return int_add(x, y)
```

The compiled code may be specialized for integers in such a way that statement #3 may only be executed if a and b were both integers, and if the previous statements #1 and #2 also produce integers. Optimized execution of the specialized compiled code while supporting full generality of, for example, JavaScript language may be possible with actual profiled evidence on integers for performing function foe (e.g. for both input variables and output results) and availability of a fall-back path (e.g. baseline instructions) for runtime values which are not consistent with the profiled evident (e.g. not integers).

The specialized compiled code for function foo may avoid repeating integer checking for both statement #1 and statement #2, such as in a first compiled code for function foo based on assumption that variables tend to contain integers without value profiling:

```
// statement #1
If( a is integer)
    If (b is integer)
        x = int_add(a, b)
    else
        x = generic_add(a, b)
else
    x = generic_add(a, b)
// statement #2
If(a is integer)
    If (b is integer)
        y = int_subtract(a, b)
    else
        y = generic_subtract(a, b)
else
// statement #3
If(x is integer)
    If(y is integer)
        return int_multiply(x,y)
    else
        return generic_multiply(x,y)
else
    return generic_multiply(x, y)
```

In the first compiled code for function foo, statement #2 must again check if a, b are integers even though statement #1 performed the check as well, as statement #1 may complete even if one of a, b was not an integer.

Further, the specialized compiled code for function foo may avoid checking the types of x, y in statement #3 even when the block of code for statement #1 and #2 produces a dynamic result (despite doing type checks), such as in a second compiled code for function foo to hoist the code for conditionals of statement #1 and statement #2 together without value profiling:

```
// statement #1 and #2
If( a is integer)
    If (b is integer)
        x = int_add(a, b)
        y = int_subtract(a, b)
    else
        x = generic_add(a, b)
        y = generic_subtract(a, b)
else
    x = generic_add(a, b)
    y = generic_subtract(a, b)
// statement #3
If(x is integer)
    If(y is integer)
        return int_multiply(x,y)
    else
        return generic_multiply(x,y)
else
    return generic_multiply(x, y)
```

In the second compiled code for function foo, generic_adds may either return integers, or they may return doubles, or strings, or objects. The generic subtracts, in JavaScript, may return either integers or doubles. Worse, even the int_add and int_subtract may produce doubles, instead of ints, because of overflow (for example $2\hat{0}30+2\hat{0}30$ produces $2\hat{0}31$, which is just outside of the signed Int32 domain).

In one embodiment, executable code compiled based on value profiling may be optimized not to re-perform checks that have already been performed and to reduce the number of handlers covering the scope of types in a particular use of a runtime variable. Evidence gathered via the value profiling may indicate the set of types the executable code is specialized for. Furthermore, the executable code may include a fall-back path (e.g. two or multiple compilers) dynamically re-compiled or re-optimized if inaccuracy of the set of types specialized for is detected.

In one embodiment, a memory location may be allocated as a bucket to store a runtime value (e.g. current runtime value) for a variable (e.g. a parameter or argument for a function call) in an executable code. For example, the bucket may be allocated in a memory heap for executing the executable code.

A dynamic compiler may insert profiling code to an executable code to update a bucket with a copy of a runtime value, for example, assigned to a corresponding variable. In one embodiment, each untyped variable may correspond to a separate bucket allocated. A bucket may store a value (or the latest value) for a variable without specifying a type or other information about the value to minimize required storage space. For example, the storage cost associated with buckets allocated for a function in an executable code may be proportional to the number of arguments of the function. Further, the bucket can be updated by overwriting a previous runtime value with the current runtime value with little performance impact. A runtime value stored in a bucket for a variable may be overwritten with a newly updated runtime value for the variable before the runtime value is sampled or collected from the bucket.

In one embodiment, profile buckets for an executable code may be scanned or sampled periodically (or on demand with occurrences of triggering events) to derive a limited number of possible types of runtime values associated with corresponding variables in the executable. For example, new types (e.g. int, double) of a variable may be derived by unifying a previously derived type (e.g. int) with the type (e.g. double) of current runtime value collected from a corresponding bucket for the variable.

Sampling or collection of runtime values from profile buckets for an executable code may be performed sporadically, sparsely and/or stochastically in an asynchronous manner to the execution of the executable code. For example, the executable code may include a loop of calls to a function with an argument (e.g. an untyped variable). Each loop may be associated with a separate runtime value stored in a common bucket for the argument. The executable code may include function counters (e.g. inserted by the compiler) counting the calls to the function during runtime. Collection of runtime values from a profile bucket for an argument of a function may be triggered at unpredictable, fuzzy or probabilistic intervals of the counts of the function counter. As a result, possibility of resonance between the sampling and the call to the function (e.g. repetitively sampling the same type of runtime values) may be minimized with the introduction of fuzziness in triggering the sampling from the profile buckets.

In certain embodiments, analysis of collected runtime values for executing a code may be performed (e.g. to synthesis a type prediction) infrequently and asynchronously to the execution of the code. Infrequent analysis can allow in-depth traverse on current runtime data without adding significant performance (or resource) cost. For example, a collected runtime value may be a pointer to an object associated with any type of value (e.g. integer, double, etc.) or even a function. The type of the object pointed to by the pointer may be identified via a traversal. Alternatively or additionally, the analysis may be performed to determine a value range for the runtime value collected. Thus, traversing the runtime data following the pointer may be necessary to identify required information about actual runtime value pointed to by the pointer. Optionally, type information may be embedded within the pointer itself (i.e. the runtime value collected), such as a bit pattern obtained through an inexpensive arithmetic operation (e.g. subtraction).

In some embodiment, whether to optimize or re-compile a previously compiled code during runtime may be based on a result of an analysis of collected profile data for the execution of the previously compiled code. For example, the analysis may indicate whether enough profile data has been collected for different parts of the code, in other words, whether profile data is full for different execution paths or code paths of the code.

Confidence of the prediction may be accessed to determine when to perform the recompilation. For example, confidence for a prediction of a type of future runtime values for a variable may be based on different runtime statuses, such as the number of observations of runtime values assigned to the variable in the past execution, duration of the past execution, a rate of success of the prediction using the profile establish during the past execution, and/or other applicable metrics or measurements.

Figure 3:
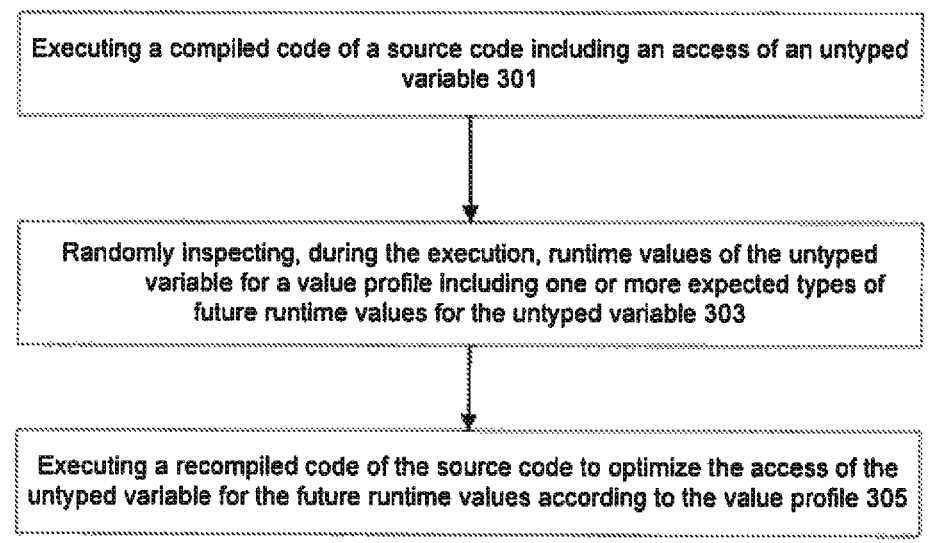
FIG. 3 is a flow diagram illustrating one embodiment of a process to profile runtime values.

FIG. 3 is a flow diagram illustrating one embodiment of a process to profile runtime values. Exemplary process 300 may be performed by a processing logic that may include hardware, software or a combination of both. For example, process 300 may be performed by some components of system 200 of FIG. 2. At block 301, the processing logic of process 300 may execute a compiled code of a source code including an access (e.g. reading or writing) of an untyped variable. The execution may include performing reading or writing dynamically typed value from or to the untyped variable for the access. The compiled code may be based on a source code in a dynamic programming language, such as JavaScript.

In one embodiment, the compiled code may include baseline instructions to allow different types of values or runtime values to be dynamically assigned to a variable. Each runtime value may belong to one of multiple types supported in a programming language. Without a scope limiting possible types of runtime values for the variable during runtime, the baseline instructions may be executed for accessing the variable regardless which type of runtime value the variable is associated with.

In some embodiments, the compiled code may include one or more profile instructions associated with a storage location allocated as a profile bucket for an untyped variable. The processing logic of process 300 can execute the profile instructions to store or update a runtime value in the storage location. The processing logic of process 300 can execute the profile instructions when the baseline instructions are executed. If a separate runtime value has previously been stored in the storage location, the processing logic of process 300 can overwrite the previously stored runtime value with the latest runtime value associated with the variable.

At block 303, the processing logic of process 300 may, during runtime, randomly inspect a profile bucket for runtime values of the untyped variable in an executable code to establish a value profile for the variable. The value profile may include expected types of future runtime values for the variable. The processing logic of process 300 may sample runtime values from the profile bucket at different times asynchronously to the execution of the executable code. In some embodiments, the different times when the profile bucket are sampled (or inspected, read, etc.) may correspond to a random sequence without resonance with runtime values assigned to the variable during the execution of the executable code.

The processing logic of process 300 may analyze sampled runtime values dynamically and infrequently for optimization opportunities. For example, the processing logic of process 300 may inspect runtime state associated with execution of a code to identify which types of value the sampled runtime values belong to. The runtime state can include object structures allocated for the execution. A sampled runtime value may refer to object structures in the runtime state. The processing logic of process 300 may determine a correspondence between the sampled runtime value and a reference to the object structures. The processing logic of process 300 may traverse the object structures (e.g. via links between the structures) in the runtime state to identify a type associated with the sampled runtime value.

In one embodiment, the processing logic of process 300 can match a sampled runtime value with a bit pattern representing a type of runtime value to determine whether the sampled runtime value belongs to the type corresponding to the bit pattern. Optionally or additionally, the processing logic of process 300 can compare the sampled runtime value with a reference to a function code to determine whether the sampled runtime value corresponds to a function reference.

The processing logic of process 300 may identify multiple types of runtime values from sampled runtime values for a variable. Each identified type may be associated with a number indicating how many of the sampled runtime values belong to the identified type (e.g. occurrence number). The processing logic of process 300 may select a subset of the identified types as expected types for future runtime for the variable. For example, the expected types (or a type prediction or value profile) may correspond to a number of most commonly encountered types sorted according to the occurrence numbers associated with the identified types based on the sampled runtime values.

In some embodiments, a value profile may be associated with a level of confidence indicating, for example, how likely a future runtime value may belong to expected types associated with the value profile. For example, an access to a variable may be associated with a function block in a code. A level of confidence on a value profile for the variable may depend on a number of calls to the function block when executing the code. The processing logic of process 300 may recompile a source code using a value profile if the level of confidence exceeds a trigger level.

The processing logic of process 300 may perform recompilation to optimize a previously compiled code during a garbage collection operation when executing the previously compiled code. Alternatively, the processing logic of process 300 may perform the recompilation when the execution of the previously compiled code is idle (e.g. waiting for occurrence of certain external or execution events).

At block 303, the processing logic of process 300 may execute a recompiled code of a source code to optimize access of an untyped variable for future runtime values expected based on a value profile or a type prediction. The recompiled code can include one or more optimized instructions for the access of the untyped variable. The optimized instructions may perform a compare or check operations to determine if a runtime value belongs to one of the expected types.

Figure 4:
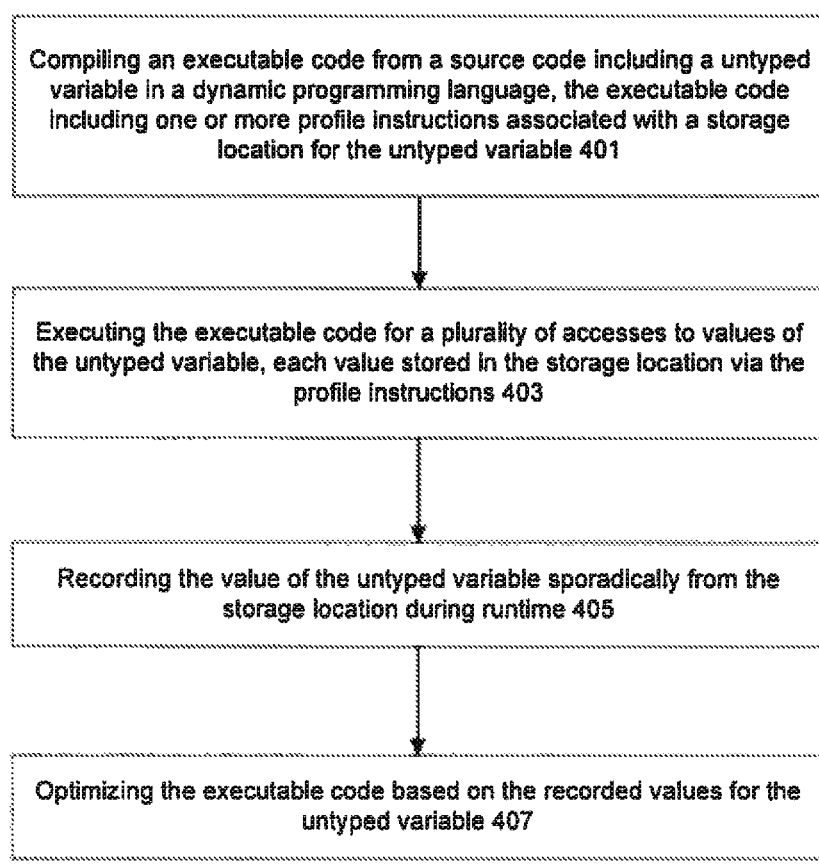
FIG. 4 is a flow diagram illustrating one embodiment of a process to sporadically record runtime values for code optimization.

FIG. 4 is a flow diagram illustrating one embodiment of a process to sporadically record runtime values for code optimization. Exemplary process 400 may be performed by a processing logic that may include hardware, software or a combination of both. For example, process 400 may be performed by some components of system 200 of FIG. 2. At block 401, the processing logic of process 400 may compile an executable code from a source code including an untyped variable based on a dynamic programming language, such as JavaScript. The executable code may include profile instructions associated with a storage location for the untyped variable.

At block 403, the processing logic of process 400 can execute the executable code for multiple accesses to runtime values of the untyped variable. Each runtime value may be stored to the storage location via the profile instructions. The processing logic of process 400 can record the runtime values of the untyped variable sporadically from the storage location. At block 407, the processing logic of process 400 can optimize the executable code based on the recorded runtime values for the untyped variable.

Figure 5:
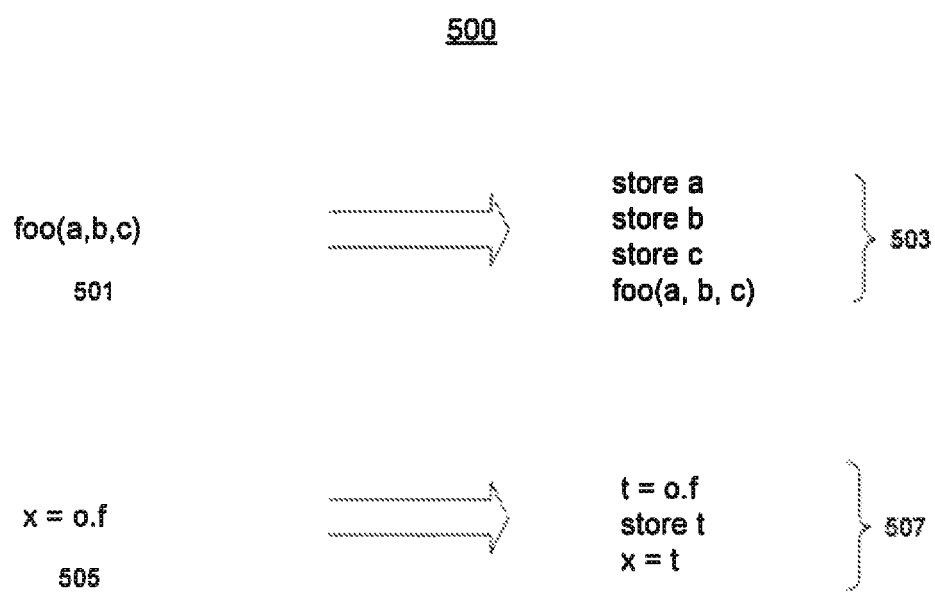
FIG. 5 illustrates exemplary profile instructions associated with storage locations according to one embodiment described herein.

FIG. 5 illustrates exemplary profile instructions associated with storage locations according to one embodiment described herein. For example, example 500 may illustrate code compiled via compilation module 205 of FIG. 2. Code 501 may represent a function call with multiple untyped arguments or parameters. Compiled instructions for the function called may include base line instructions for different possible types the function parameters. Code 503 may illustrate compiled code inserted with profile instructions to store actual runtime values of the function parameters to corresponding profile buckets whenever the function is called during runtime. Similarly, code 505 may specify an access (e.g. a load from heap operation) to property f of an untyped variable o. Code 507 may illustrate profile instructions inserted for storing runtime values accessed for the untyped variable.

Failure Profiling for Continued Code Optimization

An executable code with profiling instructions may be re-compiled multiple times for continued optimization based on dynamically updated profile information via the profiling instructions during runtime. Analysis of the profile information may identify or detect opportunities for continued code optimization. Optimization opportunities may include a type prediction for an untyped variable, failure detection of an existing optimizing code (e.g. in an optimized code), or other applicable information indicating possible performance improvements to update the current executable code.

If optimization opportunities are identified, in one embodiment, a previously compiled code may be recompiled or optimized based on the identified opportunities, for example, when a garbage collector or other system management routines are performed. Alternatively or optionally, trigger conditions based on the identified opportunities may dynamically cause re-compilation of the previously compiled code. A dynamic compiler can manage trigger conditions to determine whether to re-compile the previously compiled code based on runtime profiling.

In one embodiment, trigger conditions for continued re-compilation of a code including a function may include the number of times the function has been executed (or called), a usage rate of a memory heap allocated for the execution of the code, failure rate of an existing optimized code, or other applicable estimations or measures on whether current execution performance can be improved based on runtime data.

Trigger conditions may be configured via runtime settings based on amount of execution, memory usage rate, amount of profiling, or other applicable runtime measurements. For example, an execution counter may be maintained to track number of times a function has been executed (or called) during a period of time or cumulatively to indicate an amount of execution for a code including the function.

In one embodiment, runtime data for executing a code may include an analysis counter and an optimization counter. The analysis counter may indicate when (or an interval) to perform an analysis on profile data obtained or collected from the execution to identify optimization opportunities. For example, an analysis counter may be initialized to an initial value (e.g. 1000 or −1000) and counting down (or up) by certain amount (e.g. 1) each time a function is executed to trigger the analysis when the analysis counter counts to a certain target value (e.g. 0). An optimization counter may indicate when to perform code re-compilation to further optimize the code dynamically based on identified optimization opportunities. The optimization counter may be initialized or reset (e.g. as 10000) and count up or down to target values according to, e.g. how many times a function has been called, in a manner similar to the analysis counter. The optimization counter and the analysis counter may be initialized with different values to perform analysis and optimization operations with different schedules.

In one embodiment, analysis and/or optimization counters may be dynamically initialized with different values to control when to trigger next analysis and/or optimization operations adapted according to execution runtime. Trigger settings may include a memory usage threshold for determining when to perform next analysis and/or optimization operations. For example, memory usage threshold may indicate a usage level (e.g. ½ full, ¾ full etc.). An optimization counter may be initialized for a next round of operation (e.g. optimization) with an initial value (e.g. count) which is inversely proportional to the memory usage threshold, if the current memory usage level exceeds the memory usage threshold. For example, if the memory usage threshold indicates ½ of full memory usage and the current memory usage exceeds the memory usage threshold, the initial count previously initialized for the optimization counter may be doubled as the initial count for the next round of optimization. In some embodiments, an optimization may not be performed if some conditions in runtime data, such as the current memory usage rate greater than the memory usage threshold, are not satisfied, for example, due to lack of sampled runtime values.

Use of trigger settings, such as memory usage threshold, based on runtime settings, may allow additional flexibility in dynamically determining when to trigger optimization operations. For example, higher memory usage rate may indicate larger size of an executable code having more execution paths and requiring more in-depth profiling analysis before performing next optimization operation. In certain embodiments, trigger settings may include random variables to introduce fuzziness to identify broader optimization opportunities.

In one embodiment, an optimized code based on an optimization assumption for an untyped variable (e.g. a parameter of a function call) may include guarding instructions to detect failure of the optimization assumption. For example, an optimization assumption may correspond to a type prediction that can fail if a runtime value encountered does not match the type prediction (e.g. having a type outside of the limited number of types predicted or expected). The guarding instructions may include exit paths to jump back to non-optimized code (or baseline code) which may be capable of comprehensively handle all different possible types of runtime values encountered.

Exit paths in an optimized code may include profiling instructions (e.g. active exits) to collect runtime values which cause failures of optimization assumptions in the optimized code. For example, exit paths (e.g. associated with type checking instructions) may include value profile (or value bucket) instructions to record runtime values for the failures. Value profiles in exit paths (e.g. failure profiles or exit profiles) may allow in-depth analysis of the failures, such as probability of a certain type (e.g. integer) of runtime values causing the failures, which type checks fail, why these type checks fail, or other applicable information, etc. Both original profiles (e.g. via normal execution of optimizing code) and exit profiles may be cumulatively saved overtime for analysis.

Failure profiling in addition to regular or normal profiling (e.g. via normal execution of optimizing code) can speed up identifying and replacing optimizing code which does not benefit execution performance. In some embodiments, execution of optimizing code with type check instructions which fail most of the time may be more expensive then executing baseline code or original code corresponding to the non-optimized instructions.

In one embodiment, analysis of failure profiles may identify a rate of failure for an optimized code to determine when to trigger re-compilation operations. Trigger settings can include a failure rate threshold. For example, continued optimization (or re-compilation) may be invoked when the rate of failure exceeds a failure rate threshold. Existing optimized code (or optimized portion of code currently executed) may be invalided and with a new function via the continued optimization.

In some embodiment, invocation of re-compilation based on failures profiled may by dynamically adjusted or adapted. For example, a failure rate threshold may be doubled for next round of re-compilation to allow collecting more profile data, partly because the failure may be caused by insufficient profiling. As a result, execution of recompiled code can transition smoothly to base line code from failed optimizing code if no heuristics or speculations are identified.

Occurrence of failures with profiling in continuous (or iterative) recompilation may enable collection of large amount of information. Based on the collected profiling information, runtime behavior of an optimized code may be identified to adaptively update or re-compile the code according to an analysis result of the collected information. The analysis may be based on a speculation (or heuristics, optimization assumption) used to optimized the code. The analysis result may uncover, for example, how often the speculation succeeds, how often the speculation fails, different reasons for the success, different reasons for the failures, etc. Accordingly, behavior of the code may be observed over time for continuous recompilation or optimization to correct previous optimizations which are determined to be no longer applicable.

Figure 6:
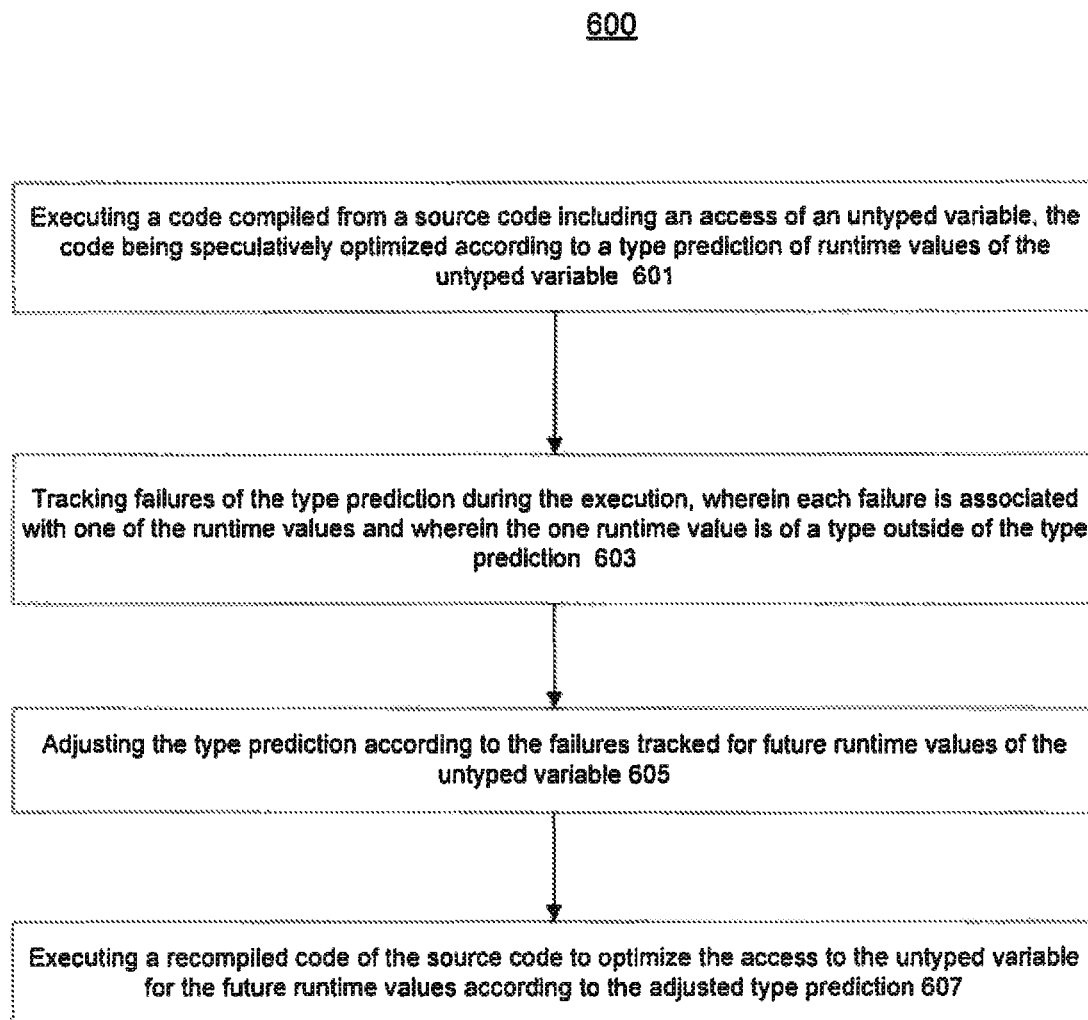
FIG. 6 is a flow diagram illustrating one embodiment of a process to track failures of type predictions used in an optimized code for recompilation.

FIG. 6 is a flow diagram illustrating one embodiment of a process to track failures of type predictions used in an optimized code for recompilation. Exemplary process 600 may be performed by a processing logic that may include hardware, software or a combination of both. For example, process 600 may be performed by some components of system 200 of FIG. 2. At block 601, the processing logic of process 600 may execute a code compiled from a source code. In one embodiment, the source code can specify a data processing task including the access to the untyped variable. The executable code may be speculatively optimized according to a type prediction of runtime values of the untyped variable. The type prediction can represent a limited collection of types among possible types of runtime values.

The processing logic of process 600 can profile a data processing task performed by a compiled code via one or more executions of the compiled code. Each execution may be based on a separately compiled code from a common source code. A profile database associated with the data processing task may be maintained based on the profiling. For example, the profile database can include statistics on types of runtime values assigned to or associated with a variable. An updated type prediction for future runtime values may be identified based on the statistics. The profile database may be analyzed to update the statistics according to a dynamic schedule specifying when to perform next re-compilation (e.g. after certain number of function calls or according to other applicable execution duration measures) for continued optimization.

In some embodiments, a compiled code may include profiling instructions to store each runtime value for an untyped variable in a preconfigured storage location, for example, in a heap memory allocated for executing the compiled code. Type information may be extracted or analyzed from runtime values collected from the preconfigured storage location into a profile database in a random and infrequent manner.

In one embodiment, a code to access an untyped variable can include baseline instructions and optimized instructions for the access of the variable. The baseline instructions can allow the code to comprehensively handle all possible types of runtime values. The optimized instructions may correspond to speculative optimizing code for efficiently accessing runtime values belonging to a subset of possible types. The code may include jump instructions to cause the baseline instructions to be executed if the optimized instructions cannot be completely executed, for example, to access a runtime value with a type outside of the type prediction.

At block 603, the processing logic of process 600 can dynamically track failures of a type prediction embedded in a code during runtime executing the code. For example, each failure may be caused by or associated with an encountered time value of a type outside of the type prediction. To track a failure of a type prediction to access a variable in a code, the type of a runtime value in a runtime state for executing the code may be identified. A profile database may be updated with the failure including the type identified. In some embodiments, the tracking may be based on executing jump instructions to the base line instructions when failures (e.g. type checking failures) occur when executing optimizing instructions based on the type prediction.

The processing logic of process 600 can monitor a runtime status for rounds of execution of a continuously compiled code. The runtime status can indicate a progress of each round of execution. The processing logic of process 600 can configure a runtime setting to specify a dynamic schedule for analyzing (e.g. when to analyze) a profile database based on the progress (e.g. failure rate or success rate for executing an optimizing code) for the executions.

In one embodiment, a runtime status can include a counter counting how many times a data processing task (e.g. a function call) has been invoked, a measure of memory usage indicating amount of memory used (e.g. out of a heap memory allocated for executing a code), or other applicable indicators for a progress of each round of execution (or execution iteration) of a continuous compiled code. A dynamic schedule can determine when to perform next re-compilation or profile analysis based on, for example, number of invocations of a data processing task indicated in the runtime status. For example, recompilation may occur less frequently than the profile analysis according to the dynamic schedule. The dynamic schedule may be updated to prolong value profiling for the execution if the runtime status indicates that the profile database does not include enough data. In one embodiment, next profile analysis may be scheduled after more invocations of the data processing task as the memory usage increases.

In one embodiment, a runtime setting for executing continuously re-compiled code compiled from a source code may include a fullness threshold indicating percentage of certain variables in the source code have been accessed and profiled during past execution cycles of the code. A runtime status for the code may indicate how many of the variables have been accessed and/or how many times each variable has been accessed. A profile database may not include enough data for re-compilation of the code if a percentage of the variables which have been assessed does not exceed the fullness threshold.

At block 605, the processing logic of process 600 may adjust a type prediction according to failures tracked for accessing an untyped variable. The adjusted or adapted type prediction is expected to better match types of future runtime values for the variable. If the adjusted type prediction indicates any type of runtime value is possible in the future for the untyped variable, the access to the variable in the code may be re-compiled with the baseline instructions without additional optimized instructions.

An adjusted type prediction may represent a separate collection of possible types of future runtime values. A recompiled code for accessing a variable may include separate optimized instructions to perform the access for the separate collection of possible types of runtime values for the variable.

In some embodiments, a failure rate for a type prediction may be determined based on a runtime status and profiled data collected in a profile data base to update the type prediction. The processing logic of process 600 may re-compile an executable code if the failure rate exceeds a failure threshold. A runtime setting may dynamically specify the failure threshold. At block 607, the processing logic of process 600 may execute the recompiled code to optimize the access to the variable for future runtime values according to the adjusted type prediction.

FIG. 7 is a flow diagram illustrating one embodiment of a process to dynamically recompile code optimized based on runtime history. Exemplary process 700 may be performed by a processing logic that may include hardware, software or a combination of both. For example, process 700 may be performed by some components of system 200 of FIG. 2. At block 701, the processing logic of process 700 can collect a runtime history for a sequence of executions. Each execution may include performing a data processing task specified in a source code based on a code compiled from the source code. In one embodiment, each execution may be followed by a next one of the executions in the sequence or in turn. The runtime history can include multiple invocations of the data processing task.

At block 703, the processing logic of process 700 can dynamically configure a setting for each execution of a code. The setting may specify conditions to initiate the next execution from current execution based on information or data profiled or collected from the runtime history. For example, the settings may include a threshold for failure rate of a speculative optimizing code.

When the runtime history is profiled to match a configured setting, at block 705, the processing logic of process 700 can recompile a previously compiled code for the next execution. The compiled code may be optimized based on the runtime history. In some embodiment, number of invocations of the data processing tasks in each execution may increase following the sequence of executions. As a result, code optimization may be dynamically adjusted as more and more profiled data becomes available for more accurate predictions in the adjusted code optimization.

Runtime State Based Code Re-Optimization

In one embodiment, a garbage collector can apply simple type transition rules on runtime data of an executable code to determine whether to remove or invalidate an optimizing code in the executable code. These rules may provide a degree of certainty whether speculative assumption on runtime values underlying the optimizing code may no longer hold for future runtime values based on current state of the runtime data. A state of runtime data may include runtime values that are live (e.g. reference by another live runtime value). Optimization opportunities may be identified during, for example, garbage collection operations or other applicable routine resource management operations for the execution of the code without a need to wait for next optimization schedule for continuous re-compilation. A runtime value that is not live may be reclaimed back via a garbage collection operation.

For example, optimization opportunities for continued optimization on an executable code may be identified based on value profiling associated with dynamic scheduled analysis tasks and early warning mechanisms associated with regularly performed resource maintenance routines (e.g. garbage collection). A profile analysis may infrequently and randomly identify optimization opportunities based on certain patterns across a history of profiled data. A resource maintenance routine can detect immediate optimization opportunities with almost complete access to current runtime data, such as heap, stack, function code, runtime structures, etc.

A runtime value or an object structure allocated in runtime data (e.g. a memory heap) may include a list (e.g. ordered list or array) of fields or slots as a type pointing (or mapped) to associated properties. Executing a function call or other applicable code block for a runtime value of a first type may result in a runtime value of a second type. For example, a runtime value of type {a,b} (e.g. as a parameter or argument to a function call) may be dynamically transitioned to a runtime value of type {a,b,c}. A separate runtime value of type {a,b,c} may be dynamically created. The garbage collector may be capable of identifying existing collection of types from runtime values allocated in current runtime data for executing a code. Further, the garbage collector may infer or derive additional possible types of future runtime values which may be created or transitioned through execution of function calls in the code.

In one embodiment, a garbage collector for runtime data associated with executing a code may be activated asynchronous to the execution of the code. For example, the garbage collector may be performed periodically or in response to certain statuses detected out of the runtime data, such as memory usage rate.

A garbage collector may determine a priori whether an optimizing code compiled or inserted in the code may provide execution overhead without actually improving execution performance. For example, the garbage collector may determine that a prediction or constraint for the optimizing code may not be valid according to current runtime data. The prediction may correspond to a limited number of types of runtime values expected to be encountered (e.g. as a parameter or argument) for a function call. The garbage collector can determine that no existing live runtime value or live object structure allocated in current runtime data belong to the limited number of runtime values or satisfy the prediction. A pointer, which is live in the current runtime data, pointing to a runtime value may indicate the runtime value pointed to is also live and in existence.

Optionally or additionally, the garbage collector can infer possible new types of future runtime values which may result from execution of a code based on current runtime data. A portion of the code (e.g. a certain function or a code block) may be live if the portion belongs to a future execution path based on the current runtime data. For example, an existing runtime value may include a pointer pointing to the function code. The garbage collector may determine whether a function code included in the code is live or not.

In one embodiment, an optimizing code optimized in a code based on a prediction can be invalided or removed if the prediction is no longer valid. For example, the prediction may not be valid if no existing runtime values of current runtime data of the code belongs to the prediction and no new types of future runtime values which can be generated belong to the prediction. The future runtime values may be generated based on the current runtime data and live function codes of the code. The garbage collector can cause a re-compilation to optimize the code dynamically without waiting for a discovery of invalidity of the optimizing code (e.g. after repeated failures), for example, via profiling analysis.

A garbage collector may be performed to solve a Boolean constraint system including type transition rules transitively applied to current runtime data for executing a code. A function code of the code may correspond to a set of rules, each rule specifying transition or creation of one type of runtime values to another type of runtime values. For example, a rule or transition rule may specify a transition from a source type to a destination type $\{X\} \rightarrow \{X,f\}$, X indicate a possible type of runtime values. When this rule is applied, existence of a source type of runtime values, for example, $\{a,b\}$ may imply existence of a destination type of runtime values $\{a,b,f\}$.

An optimizing code based on a type prediction may be valid for executing a code including the optimizing code if current runtime data of the code includes a runtime value satisfying the type prediction or if there is an execution path including calling one or more functions in the code to transition or create a new runtime value satisfying the type prediction based on the current runtime data. Based on the constraint system with type transition rules, a garbage collector may check which structures (or runtime values) in existence in the current runtime state and/or which functions (or live function) of the code to transition the existing runtime values to cause the optimizing code to execute successfully in the future.

In some embodiments, a garbage collector may include a callback hook to a dynamic compiler. The garbage collector, when activated, can call back to the dynamic compiler through the callback hook to determine whether an optimizing code is valid based on type or structure transitions over current runtime data. The garbage collector may include a knowledge base to answer queries from the dynamic compiler on existence of different types of runtime values or pointers to functions (e.g. live functions) in the code for the structure transition analysis.

FIG. 8 is a flow diagram illustrating one embodiment of a process to detect invalidity of type prediction to update an optimized code. Exemplary process 800 may be performed by a processing logic that may include hardware, software or a combination of both. For example, process 800 may be performed by some components of system 200 of FIG. 2. At block 801, the processing logic of process 800 may execute a code compiled from a source code including an access to an untyped variable (or a dynamically typed value associated with the untyped variable). The access may be compiled with speculative optimization as an optimized access code in the code via a type prediction of runtime values of the untyped variable. A type prediction can specify expected types of runtime values for a variable, such as a function parameter. The runtime values may be dynamically allocated in a memory heap for executing the code.

At block 803, the processing logic of process 800 can dynamically detect invalidity of a type prediction used in an optimizing code currently being executed. Future runtime values for an untyped variable accessed in the optimizing code may not belong to the types associated with the type prediction. Existing types of current runtime values can be identified from current runtime data. The type prediction may be valid if one or more of the identified type belong to the type prediction. A non-optimized access code (e.g. baseline code or instructions) for an untyped variable may be compiled based on a collection of each possible type of runtime values for an untyped variable. Expected types of a type prediction may correspond to a subset of the collection of each possible type.

In one embodiment, a source code can specify one or more functions. Each function can be associated with dynamically typed variables including input variables (e.g. parameters). Execution of the function (e.g. via a function call) can result in updates of the variables. For example, new types of runtime values may be generated as destination or target types of runtime values from source types of runtime values for input variables. A function can represent a structure transition from a source collection of types to a target collection of types. Each target type can correspond to one of updated variables in the function based on input variables having the source types of runtime values.

In some embodiments, the processing logic of process 800 can identify a sequence of functions in a code for detecting whether a type prediction is valid. For example, the processing logic of process 800 may transitively transition types of the existing runtime values (e.g. live runtime values) to a resulting collection of types of runtime values via structure transitions in order corresponding to the sequence of functions. A type prediction may be valid if at least one of the resulting collection of types belongs to the expected types associated with the type prediction. The processing logic of process 800 can determine whether the sequence of functions can be identified for possible structure transitions to answer a query about validity of a type prediction.

For example, a sequence of functions can include a first function and a second function next to the first function according to the sequence. The first and second functions can correspond to a first and second structure transitions respectively. A first collection of types may be transitively transitioned to a second collection of types via the first structure transition and then the second structure transition following the order in the sequence. The first collection of types may be transitioned to an intermediate collection of types via the first structure transition. Subsequently, the intermediate collection of types may be transitioned to the second collection of types via the second structure transition.

The processing logic of process 800 may detect invalidity of a type prediction with expected types if no existing runtime values (e.g. which are live) are of the expected type and no sequence of functions (e.g. live functions) are identified to transitively transition types of existing runtime values to at least one of the expected types. The processing logic of process 800 may initiate detection of invalidity of a type prediction via garbage collection operations performed to maintain, for example, a heap allocated for a corresponding executable code.

In one embodiment, the processing logic of process 800 may determine whether a function is invokable or live for identifying a sequence of functions for validity of a type prediction. A function may be invokable if an existing runtime value includes a pointer pointing to the function. Alternatively, a function may be invokable if an invokable function specifies a call to the function. An existing runtime value may correspond to a runtime object having data structures including pointers. For example, the pointers may include a function pointer referencing a live or invokable function. A function may be live or invokable if the function is referenced by a live runtime value (e.g. via a pointer). Each one of a sequence of functions identified for validity of a type prediction may be invokable.

At block 805, the processing logic of process 800 can update a previously compiled code speculatively optimized using an invalid type prediction for accessing a variable. The updated code can include an access code without the speculative optimization. In one embodiment, the processing logic of process 800 may profile execution of the compiled executable code to collect one or more types of values assigned to the untyped variable during runtime. The invalid type prediction may be based on previously collected values which are of different types from recently encountered values.

In one embodiment, the access of the untyped variable may be specified in a function of a source code corresponding to the executable code. The function may have input variables (or arguments) including the untyped variable. The executable code may include an optimally compiled function code for the access to the untyped variable optimized based on the type prediction. The updated code may include a non-optimized compiled function code for the function. The optimally compiled function code may be removed from the updated code.

The processing logic of process 800 can recompile the executable code dynamically during runtime to remove the optimally compiled function code to update the executable code. At block 807, the processing logic of process 800 can execute the updated code without executing the optimized access code for the future runtime values of the variable. In some embodiments, the executable code may be recompiled to replace the optimally compiled function code with an updated optimally compiled function code. The updated optimally compiled code may be based on an updated type prediction corresponding to currently collected types of runtime values via value profiling for future runtime values.

Figure 9:
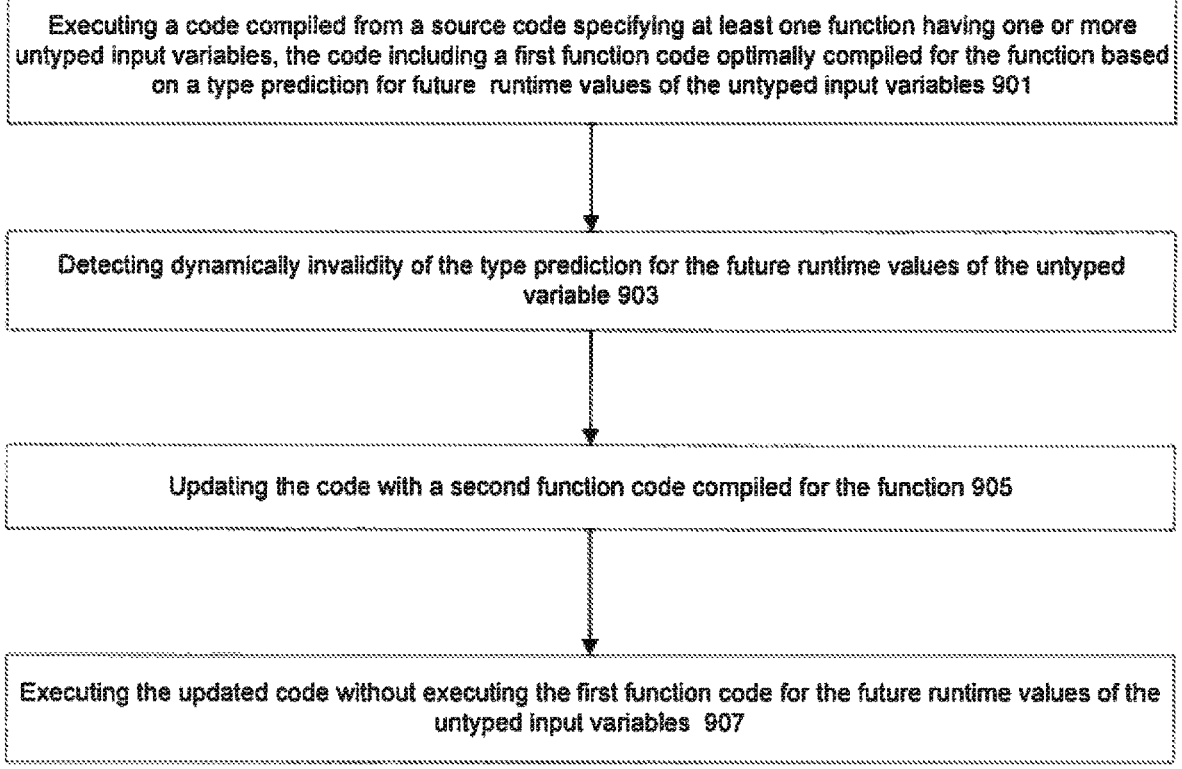
FIG. 9 is a flow diagram illustrating one embodiment of a process to detect invalidity of type prediction to update an optimized function code.

FIG. 9 is a flow diagram illustrating one embodiment of a process to detect invalidity of type prediction to update an optimized function code. Exemplary process 900 may be performed by a processing logic that may include hardware, software or a combination of both. For example, process 900 may be performed by some components of system 200 of FIG. 2. At block 901, the processing logic of process 900 may execute a code compiled from a source code specifying at least one function having untyped input variables. The code can include a first function code optimally compiled for the function based on a type prediction for future runtime values of the untyped input variables.

In one embodiment, execution of the code may be based on a memory heap allocated (e.g. specifically for the code) with objects corresponding to existing runtime values. Garbage collection operations may be performed to dynamically maintain the memory heap, for example, to reclaim memory allocations no longer needed for the execution of the code, such as runtime values which are not live.

At block 903, the processing logic of process 900 can detect dynamically invalidity of the type prediction for the future runtime values of the untyped variable. For example, garbage collection operations can include callbacks to initiate the detection of validity or invalidity of the type prediction. The processing logic of process 900 can determine whether types of future runtime values overlap with expected types associated with the type prediction. The type prediction may be invalid if the types of the future runtime values do not overlap with the expected types. The types of future runtime values may include the types of existing runtime values identified from a memory heap for the code.

At block 905, the processing logic of process 900 can update the code with a second function code compiled for the function. The second function code can be compiled without the speculative optimization. The processing logic of process 900 can execute the updated code without executing the first function code for the future runtime values of the untyped input variables at block 907.

Figure 10:
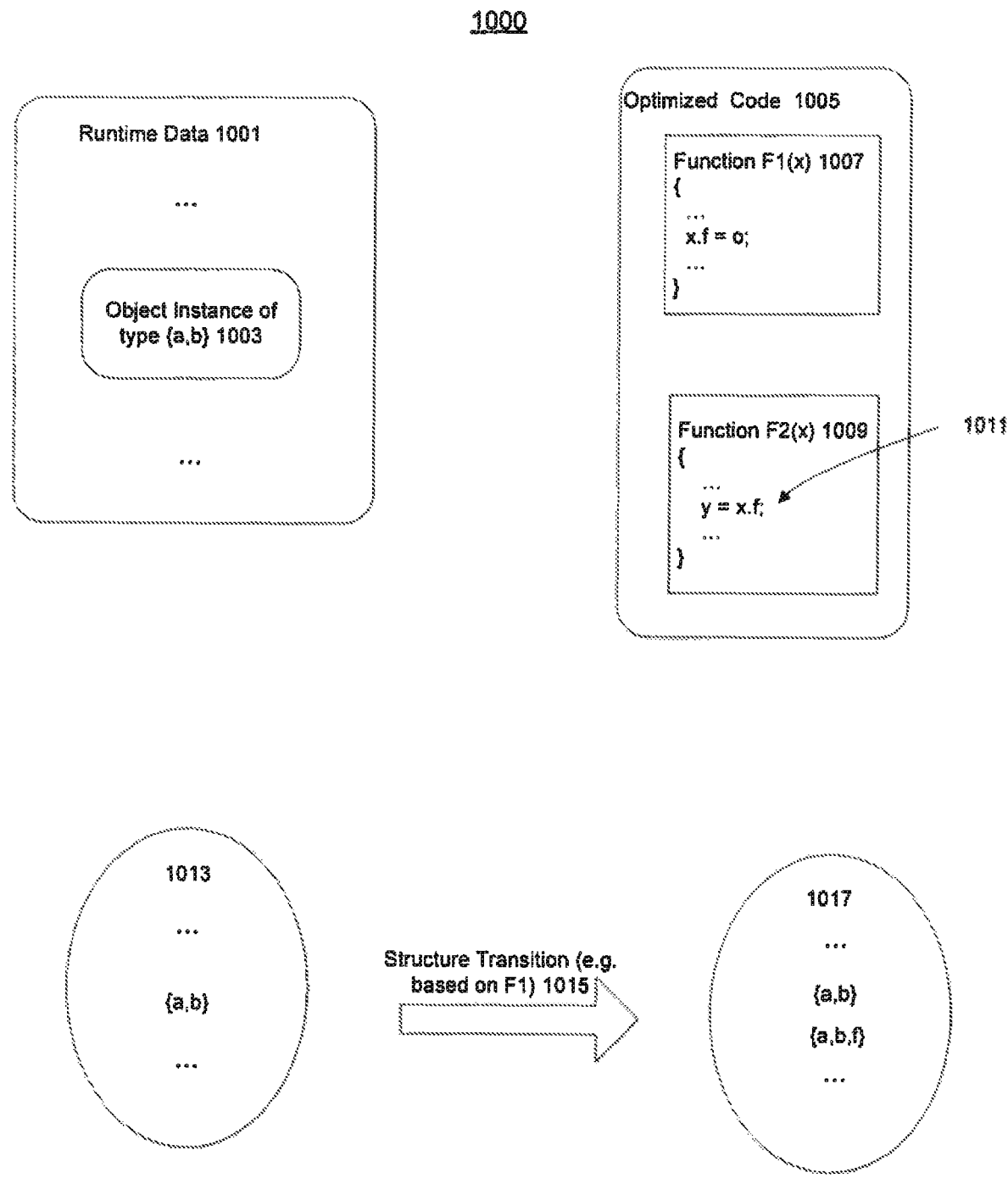
FIG. 10 illustrates one example of runtime data and optimized code for identifying validity of a type prediction based on structure transitions in the runtime data according to one embodiment described herein.

FIG. 10 illustrates one example of runtime data and optimized code for identifying validity of a type prediction based on structure transitions in the runtime data according to one embodiment described herein. Example 1000 may include runtime data 1001 corresponding to a snapshot of current runtime data for executing optimized code 1005. Runtime data 1001 may include object (or runtime value) 1003 of type {a,b}. Function code 1009 may include optimizing code 1011 based on a type prediction of a limited number of expected types of runtime values, for example, ({f}, {a,f}, {b,a,f}). Runtime data 1001 may not include any runtime value or object structure allocated with type {f}, {a,f} nor {b,a,f}. Code 1005 may include live function F1 1007. For example, a function pointer of runtime data 1001 may point to function F1 1007.

In one embodiment, source types 1013 including type {a,b} may be identified from existing runtime values of runtime data 1001. Application of transition rules or structure transition 1015 based on, for example, function F1 1007 may derive destination types 1017. In one embodiment, function F1 1007 may generate a possible future runtime value of type {a,b,f} (e.g. destination type) from a source type {a,b} of existing object 1003. A transition rule may be applied transitively to a future object of a destination type to generate another future object of another destination type.

Split Heap Garbage Collection

Dynamically typed objects may be allocated as cells associated with properties in a memory heap allocated for executing a code (e.g. in a process) based on dynamically typed languages such as JavaScript. The code may be linked with a separate code (e.g. in the same process) based on non-dynamically based languages, such as C or C++. The memory heap may be partitioned or split into multiple parts, each part associated with a separate garbage collection mechanism. For example, a dynamically typed object may be stored with its cell in one part of the heap and its properties in a separate part of the heap to allow the separate code to directly access the properties without the overhead of an extra handle object (or extra layer of indirection) created to interface with the separate code.

In one embodiment, object allocated by a JavaScript (or other applicable dynamically typed language) code may point to a property structure which is dynamically updated for the object during runtime. The JavaScript code may be linked with a C (or other applicable non-dynamically typed language) code implementing a function. The function (e.g. C function or C++ function) may be called with a pointer to the property structure of the JavaScript object directly from the JavaScript code. Conversely, the function can call JavaScript functions in the JavaScript code.

Memory management operations, such as garbage collection operations, may be performed for maintaining a memory heap to execute the JavaScript code linked with, for example, a C code. Dynamic properties of the JavaScript objects may be allocated in one partition of the heap. For example, an unused (or not live) object may be reclaimed back to the heap regardless whether corresponding properties of the unused object is currently referenced by a function in the C code or not.

In one embodiment, moving and non-moving garbage collection operations may be performed on separate partitions of a heap in a cooperative manner in parallel for moving (or copying) live (or currently used) memory space around in the heap to reclaim unused memory space with minimum memory space overhead, for example, less than two folds of memory space of the heap. The moving garbage collector may move or copy allocated memory slots around in the heap to defragment memory allocation (e.g. removing holes which are available memory segments between unavailable or used memory slots). The non-moving garbage collector can collect and maintain pointers indicating which memory slots are currently available.

In one embodiment, moving garbage collector may move objects or allocated memory slots which are currently in use or live out of the way to make room in a memory space (e.g. heap) to satisfy future allocation. Overhead incurred in the moving garbage collector may include maintaining or updating reference pointers from other objects to the moved (or copied) object. Total overhead to reclaim back unused memory allocation may be reduced by half via moving objects around. Memory slots allocated for dynamic properties of, for example, JavaScript objects referenced by a C or C++ function, may be pinned from being moved by a moving garbage collector. The moving garbage collector can perform memory management operations based on an assumption that an allocated object may be referenced (e.g. pointed to by a pointer) by at most one pointer (e.g. an owner of the object) to allow immediate release of an old version (or allocated space) of the object after the object has been copied.

A non-moving garbage collector may scan allocation holes (e.g. adjacent between two allocated memory slots) which are not used (or not live) and linked them together for future allocation. The non-moving garbage collector may allocate memory space with a number of pre-specified sizes. In one embodiment the non-moving garbage collector can maintain a free list indicating (e.g. via pointers) free space available for allocation.

Garbage collection operations may be invoked when attempts to allocate memory (e.g. in response to allocation requests from code execution) fail. In one embodiment, memory allocation schemes for a heap may be based on two data structures representing a mark space and a copy space respectively to partition the heap. Separate policies may be applied to collect or reclaim available memory allocations for each partition.

In one embodiment, mark space may include multiple lists of memory blocks, such as a fixed sized 64K or other applicable size memory block. Each list may be associated with allocating memory slots of a certain sizes, such as 32 bytes, 64 bytes, . . . or other applicable size. Lists of free cells (or available memory slots) may be maintained to efficiently designate selected free cells for allocation requests. If failures occur to allocate requested memory slots (e.g. on receiving memory allocation requests), a decision may be made to invoke garbage collection operations.

Whether to perform garbage collection operations may be determined based on memory usage indicators, for example, indicating amount of memory used or ratio of memory used (e.g. relative to the size of mark space). Garbage collection operations may be invoked if the amount of memory used exceeds the target usage budget. The target usage budget may be dynamically configured to, for example, a double of the size of total live objects, to control memory allocation performance.

In one embodiment, copy space may include one list (e.g. linked list) of memory blocks for allocating memory slots of varying sizes. Variable sized objects may be allocated in the copy space faster than in the mark space. For example, each memory block in the copy space may be identical in size (e.g. 64K bytes). A separate list of oversized memory blocks may be maintained for allocating arbitrarily large size memory slots.

In some embodiment, a salvage thread may control when to release freed memory space or request additional memory space to/from an operating system based on a recycling policy without a need to immediately returning the freed memory space back to the operation system. A memory block may include meta data. For example, the meta data may include a next pointer (or next offset) pointing to a start address of available memory. Optionally or additionally, the meta data may include a counter counting number of memory slots allocated in the corresponding memory block. Garbage collection operations may be performed to copy or move memory slots for compaction or defragmentation.

FIG. 11 is a flow diagram illustrating one embodiment of a process for performing moving and nonmoving garbage collections concurrently on separate portions of a heap. Exemplary process 1100 may be performed by a processing logic that may include hardware, software or a combination of both. For example, process 1100 may be performed by some components of system 200 of FIG. 2. At block 1101, the processing logic of process 1100 can maintain first structures and second structures in separate portions of a heap in a memory to execute a code based on the heap. For example, the heap may be partitioned in a first portion and a second portion, the first portion including the first structure and the second portion including the second structures. Each second structure may be referenced by at most one of the first structures. One the first structures may represent an object created during runtime executing the code corresponding to the heap. The object can have a dynamic property associated with one of the second structures.

In one embodiment, the code may be compiled from a source code in a dynamically typed language, such as the JavaScript language. The object may be dynamically typed having a cell representing a handle to the object. The cell can correspond to one first structure having a reference to a second structure. The code may be linked with a particular code capable of referencing the dynamic property of the object without referencing the first structure representing the object. The particular code may belong to a library (e.g. static or dynamic) linked with the code. For example, the particular code may be compiled from a particular source code having programming interfaces (e.g. application programming interfaces to allocate/free memory space) to manage memory usage in the heap. Memory space allocated in the heap via the particular code may be de-allocated (or reclaimed) via the particular code. The dynamically typed programming languages may not support memory management interfaces and require a separate memory management routine, such as a garbage collector, for executing executable code based on the dynamically typed programming language.

In one embodiment, the first portion of the heap can include first memory blocks. Each first memory block may be associated with a slot size for allocating one or more fixed sized slots (or memory slot) of the slot size. The first structures may be allocated in the first memory blocks associated with a (e.g. pre-specified) number of first slot sizes. The first structure representing the object may be allocated in one first memory block associated with one first slot size in response to receiving a request to allocate a memory slot of a size in the first portion of the heap. The first slot size may be determined to best match the size among the number of first slot sizes based on the size requested.

At block 1103, the processing logic of process 1100 may perform non-moving garbage collection operations on the first portion of the heap to identify which of the first structures are available for future allocation from the first portion of the heap without moving or copying the identified first structures. The processing logic of process 1100 may determine whether there is free memory space or slots available in response to a request for allocating a fixed sized memory slot (e.g. in the first portion of the heap) or a varied sized memory slot (e.g. in the second portion of the heap). The processing logic of process 1100 may perform memory management operations including the non-moving garbage collection operations if free memory slot of a requested size in the second memory blocks is not available.

In one embodiment, a stack may be allocated in the heap for executing the code. For example, the stack may include a call stack to call a library function linked via the particular code. The stack may include a list of pointers or values including first references to the first portion of the heap and second references to the second portion of the heap. The processing logic of process 1100 may scan the stack to identify the first and second references.

In some embodiments, the processing logic of process 1100 can identify or determine which first structures in the first portion of the heap are live (or live first structures) for performing the non-moving garbage collection operations. A live structure (e.g. a live first structure in the first portion of the heap or a live second structure in the second portion of the heap) may indicate that one or more memory slots allocated for the structure are currently not available (or in use) for executing the code. For example, a particular first structure is live if the particular first structure is referenced (or pointed to) in the first references of the stack or if the particular structure is referenced by another live first structure.

The processing logic of process 1100 can identify live first structures based on first references of the stack. For example, the first structures in the first portion of the heap may be related via a hierarchical relationship (e.g. an object hierarchy or class inheritance hierarchy in the JavaScript language or other object oriented languages) established via the execution of the code. A parent first structure of the hierarchical relationship can have one or more offspring or child first structures. If the parent first structure is identified as live, each of the offspring first structures may be identified as live.

At block 1105, the processing logic of process 1100 can perform moving garbage collection operations on the second portion of the heap in a coordinated manner with the nonmoving garbage collection operations. For example, the second portion of the heap may be compacted or de-fragmented via the moving garbage collection operations to identify which of the second structures are movable within the second portion of the heap for future memory allocation of the second portion of the heap. The nonmoving garbage collection operations and the moving garbage collection operations are performed iteratively substantially in parallel.

In one embodiment, a second structure in the second portion of the heap for an object allocated by the code (e.g. a JavaScript code) in the first portion of the heap may not be movable (e.g. copied to another address) if the second structure is referenced by the particular code (e.g. a C++ library) linked with the code. The particular code may reference the second structure in via the stack without referencing the object in the first portion of the heap. The second portion of the heap can include second memory blocks to allocate varied sized slots or memory slots. The second structure may be allocated in a varied sized slot in the second memory blocks.

In one embodiment, the second references identified from the stack may correspond to varied sized slots in the second memory blocks in the second portion of the heap. The processing logic of process 1100 can perform memory collection operations for the moving garbage collection operations. The collection operations may be performed to identify which portions of the second memory blocks are not movable or pinned. For example, the pinned portion (or non-movable portion) of the second memory blocks may include the varied sized slots of the second memory blocks corresponding to the second references of the stack.

The processing logic of process 1100 can identify which of the second structures are live (or currently not available for allocation) in the second portion of the heap. A live second structure may be referenced by a live first structure or by another live second structure. A live second structure may be movable if the live second structure does not belong to the pinned portion of the second memory blocks.

In one embodiment, the second portion of the heap can include a first memory space which is fragmented and a second memory space which is available for allocation. The second memory blocks including the movable second structures may be allocated in the first memory space. The processing logic of process 1100 may copy the identified movable second structures to the second memory space to de-fragment or compact the second portion of the heap. Memory space in the first memory space which does not belong to the pinned portion of the second memory blocks may be reclaimed via the moving garbage collection operations.

In one embodiment, a second memory block in the second portion of the heap may include meta data such as a counter dynamically counting or storing second a number of second structures allocated in the memory block. The counter may be counted up (e.g. by one or another fixed amount) when a memory slot is allocated in the second memory block for a new second structure. Conversely, the counter may be counted down (e.g. by one or another fixed amount) when an existing memory slot corresponding to an existing second structure is copied or moved out of the second memory block. In one embodiment, the second memory block may be released (or freed) substantially when the counter counts down to zero (or another pre-specified value).

FIG. 12 is a flow diagram illustrating one embodiment of a process to scan a stack to identify live memory slots and pinned memory slots to reclaim memory slots which are not live and not pinned by moving the live memory slots without moving the pinned memory slots. Exemplary process 1200 may be performed by a processing logic that may include hardware, software or a combination of both. For example, process 1200 may be performed by some components of system 200 of FIG. 2. At block 1201, the processing logic of process 1200 can scan a stack used in executing a code compiled from a dynamic programming language based source code. The stack may include an ordered collection of references to a heap allocated for the execution of the code. The processing logic of process 1200 may determine whether a value stored in the stack is a pointer to an address in the heap conservatively, for example, based on heuristics related to possible range of memory addresses, bit patterns of the value and/or other applicable indicators.

In one embodiment, the heap may be partitioned into first memory blocks and second memory blocks. The first memory block may be allocated with fixed sized slots or memory slots. The second memory blocks may be allocated with varied sized slots. A varied sized slot may be referenced by at most one fixed sized slot which may include a pointer pointing to a memory address within the varied sized slot. Objects may be instantiated or created in the slots during ti e executing the code. A hierarchical relationship may be established among at least two of the fixed sized slots corresponding to an object hierarchy specified in the code. For example, an object hierarchy for JavaScript language may indicate a class inheritance among cells, objects, layout objects, arrays, strings etc.

At block 1203, the processing logic of process 1200 can identify which of the fixed sized slots are live (or live fixed sized slots). For example, each fixed sized slot referenced by the references in the stack can be identified as live. Each fixed sized slot referenced (e.g. via a pointer or based on a hierarchical relationship) by a live fixed sized slot can also be identified as live. The processing logic of process 1200 may identify which of the varied sized slots are live at block 1205. Each varied sized slot referenced by a live fixed size slot can be identified as live.

A varied sized slot may be live if it is referenced by a live fixed sized slot. A fixed sized slot referenced by a live fixed sized slot may also be live. Live fixed sized slots can include each fixed sized slot referenced in the stack (e.g. via one of the first references). In some embodiments, a parent fixed sized slot refers child fixed sized slots according to a hierarchical relationship. A child slot may be live if its corresponding parent slot is live.

The processing logic of process 1200 can identify live memory slots according to a traversal of reachable memory slots from the stack via pointers and/or the hierarchical relationship. For example, the stack may indicate a known set of live objects allocated in live memory slots. Each object may be transitively visited to mark for reachability (or being live), for example, following the hierarchical relationship or other pointers associated with object.

In one embodiment, an object may correspond to a fixed sized slot referencing a varied sized slot allocated with dynamic properties of the object. A live object may be associated with private memory space for the second memory blocks. The processing logic of process 1200 may copy the dynamic properties in the varied sized slot to the associated private memory when visiting the object in the fixed sized slot to reduce number of traverses required among the objects in the heap to manage the memory blocks.

A list of objects, e.g. related as a directed graph via references among the objects and private memory space may be maintained for traversal. The graph may be rooted with objects referenced directly by the stack. The processing logic of process 1200 can visit or traverse the list of objects and identify which visited objects as live or reachable following the graph. Dynamic properties (e.g. allocated in the secondary memory blocks) of an object may be copied to private memory space as the object is encountered during the traversal. The dynamic properties in the varied sized slot may be copied or moved to make room (or memory space) to compact the second memory blocks.

In one embodiment, a varied sized slot may belong to a memory block having a header with meta data including a counter counting the number of slots allocated. As the dynamic properties are copied, the counter may be decremented. The memory block may be released substantially immediately when the counter indicates that objects in allocated slots in the memory block have been copied or moved.

The processing logic of process 1200 can coordinate collections of memory slots in the first and second memory blocks concurrently (e.g. interleaved) in one traversal pass through the graph of objects. Objects to be marked (or visited) may be scheduled via a global queue to limit the depth of traversal path required in traversing the graph, for example, to avoid traversal stack overflow.

At block 1207, the processing logic of process 1200 can identify pinned portion of the second memory blocks according to the references of the stack. For example, each varied sized slot referenced by the references of the stack can belong to the pinned portion of the second memory blocks. In one embodiment, a second memory block including a second slot referenced by a reference in the stack may belong to the pinned portions of the second memory blocks. Contents in memory slots within a pinned memory block (e.g. belonging to the pinned portions) may not be copied or moved for memory collection, e.g. during traversal of the object graph. For example, the stack can include a reference to a dynamic property of a JavaScript based object to allow a C++ or C function (e.g. in a linked library) to directly access the dynamic property of the JavaScript based object.

At block 1209, the processing logic of process 1200 can copy or move the live varied sized slots that are not pinned (or in the pinned portion of the second memory blocks) to make room for future allocation. At block 1211, the processing logic of process 1200 can defragment the first memory blocks to reclaim the fixed sized slots which are not live without moving the fixed sized slots, e.g. via non-moving garbage collection operations. The processing logic of process 1200 can defragment the second memory blocks to reclaim the varied sized slots which have not been copied and not in the pinned portion of the second memory blocks, e.g. via moving garbage collection operations, at block 1213.

In one embodiment, the code (e.g. a JavaScript code) may be linked with a particular code having a function (e.g. a C function). A call to the function from the code may be associated with a particular one of the references of the stack. For example, the particular reference can correspond to a runtime value for an argument for the function. In one embodiment, the particular reference may refer to a particular one of the varied sized slots which is referenced by a particular one of the fixed sized slots. The processing logic of process 1200 can identify the particular varied sized slot as pinned to allow the function to access the particular varied sized slot directly without using the fixed sized slots in the heap.

Figure 13:
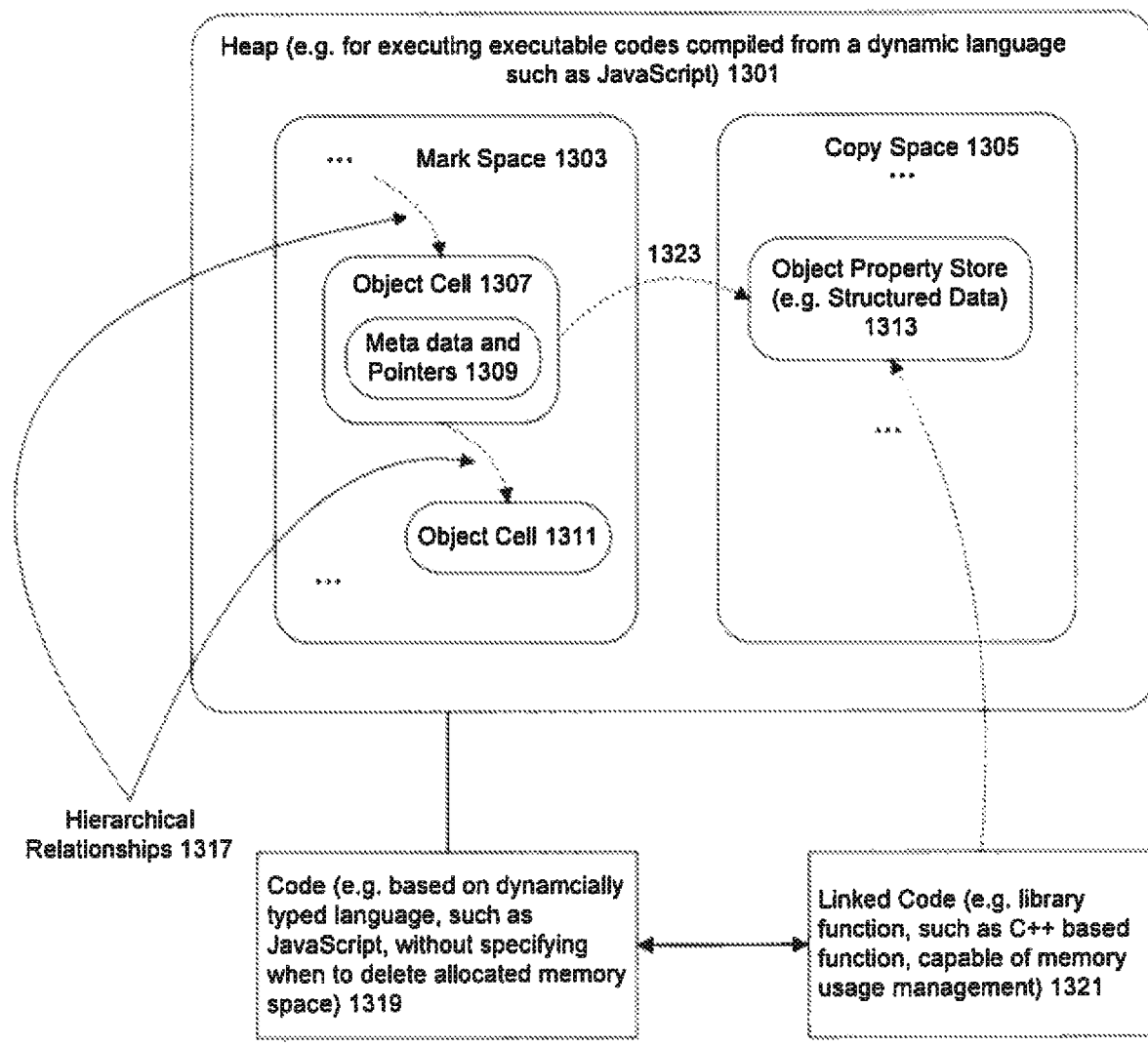
FIG. 13 illustrates one example of split partitions in a heap for executing a code according to one embodiment described herein.

FIG. 13 illustrates one example of split partitions in a heap for executing a code according to one embodiment described herein. For example, heap 1301 may be part of runtime data 217 of FIG. 2. In one embodiment, heap 1301 may be allocated for executing code 1319 compiled from a dynamically typed language (e.g. JavaScript) based code. Code 1319 may not include instructions to perform memory management operations (e.g. to collect or reclaim unused memory space) on heap 1301. Code 1319 may be linked with code 1321 based on, for example, a non-dynamically typed programming language, such as C, C++ in a library. Code 1321 may include memory management instructions to explicitly allocate/free memory space used in heap 1301.

Heap 1301 may include mark space 1303 and copy space 1305 as two partitions. Mark space 1303 may be allocated with runtime objects, such as object cells 1307, 1311, created (e.g. implicitly) as a result of executing code 1319. An object cell may be allocated in a fixed sized memory slot. In one embodiment, an object cell may include meta data and/or pointers, for example, to indicate relationships with other object cells, to point to associated dynamic properties, to represent a number of references to the object cell and/or other applicable data properties. For example, meta data 1309 of object cell 1307 may include pointers 1323 pointing to object property store 1313 storing dynamic properties for object cell 1307.

In one embodiment, object property store 1313 may be allocated in copy space 1305 in a varied sized memory slot. Size of object property store 1313 may vary dynamically. Pointer 1323 may be a single reference to object property store 1313. No other objects except object cell 1307 may reference object property store 1313. Code 1321 may include a pointer pointing directly to object property store 1313 to allow code 1321 to process data stored within object property store 1313 directly without a need for a handle object cell as an intermediate layer to access the data in object property store 1313.

Figure 14:
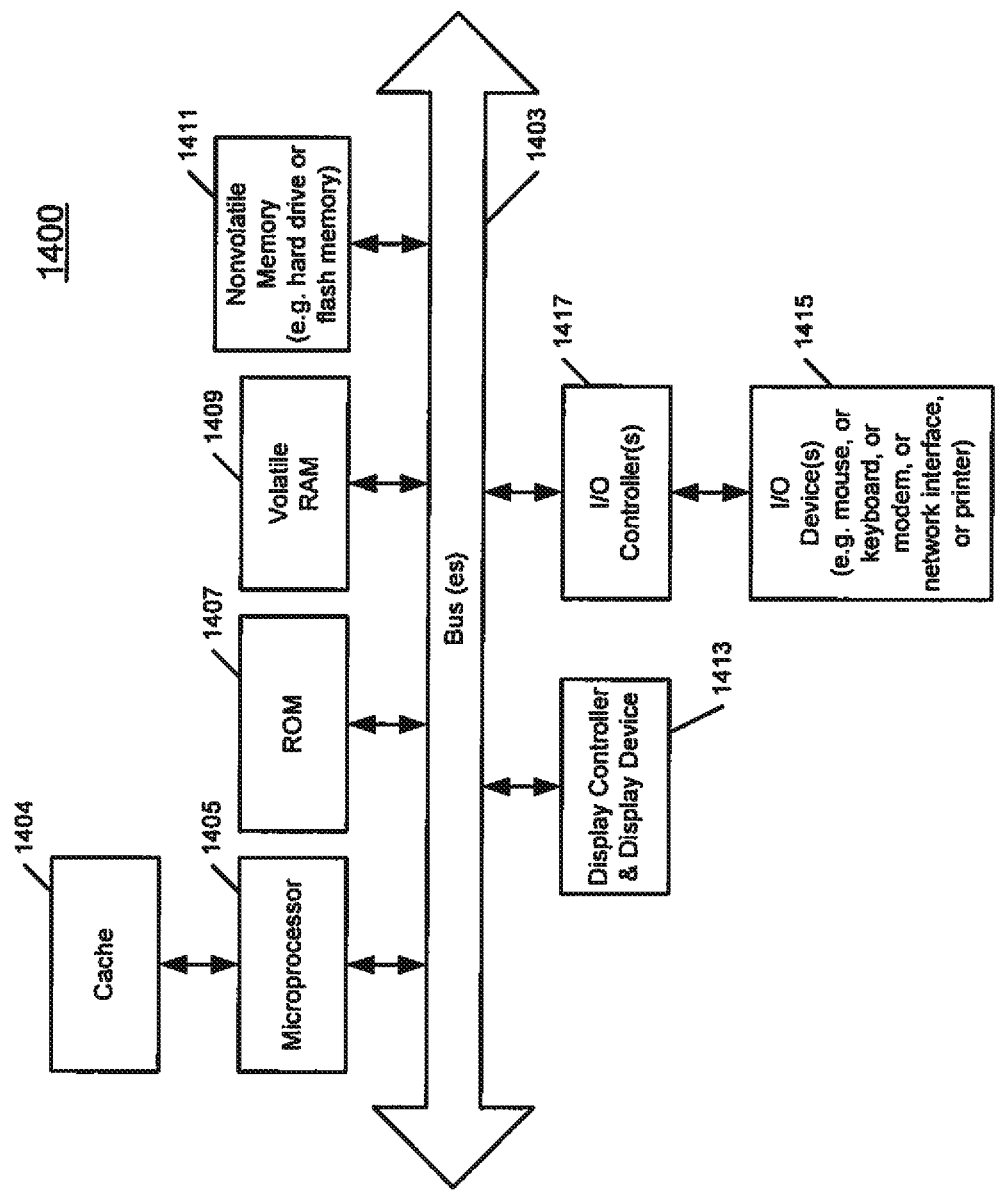
FIG. 14 illustrates one example of a data processing system such as a computer system, which may be used in conjunction with the embodiments described herein.

FIG. 14 shows one example of a data processing system, such as a computer system, which may be used with one embodiment the present invention. For example, the system 1400 may be implemented as a part of the system shown in FIG. 1. Note that while FIG. 14 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 14, the computer system 1400, which is a form of a data processing system, includes a bus 1403 which is coupled to a microprocessor(s) 1405 and a ROM (Read Only Memory) 1407 and volatile RAM 1409 and a nonvolatile memory 1411. The microprocessor 1405 may retrieve the instructions from the memories 1407, 1409, 1411 and execute the instructions to perform operations described above. The bus 1403 interconnects these various components together and also interconnects these components 1405, 1407, 1409, and 1411 to a display controller and display device 1413 and to peripheral devices such as input/output (I/O) devices which may be mice, keyboards, modems, network interfaces, printers and other devices which are well known in the art. Typically, the input/output devices 1415 are coupled to the system through input/output controllers 1417. The volatile RAM (Random Access Memory) 1409 is typically implemented as dynamic RAM (DRAM) which requires power continually in order to refresh or maintain the data in the memory.

The mass storage 1411 is typically a magnetic hard drive or a magnetic optical drive or an optical drive or a DVD RAM or a flash memory or other types of memory systems which maintain data (e.g. large amounts of data) even after power is removed from the system. Typically, the mass storage 1411 will also be a random access memory although this is not required. While FIG. 14 shows that the mass storage 1411 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1403 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic, non-transitory or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:
    executing a code compiled from a source code, the source code including an access of an untyped variable, the access being compiled with speculative optimization as an optimized access code in the code via a type prediction of future runtime values of the untyped variable, the type prediction deriving expected types for the future runtime values by sampling runtime values from value buckets of value profiles sporadically or stochastically, the type prediction initiated in response to a configurable trigger condition of one or more configurable trigger conditions, wherein values profiles are allocated to store existing runtime values assigned to the untyped variable, wherein at least one existing runtime value is stored in a value profile without a type;
    detecting, dynamically, a likely invalidity of the type prediction for one or more of the future runtime values of the untyped variable is initiated in response to the one or more configurable trigger conditions, wherein the one or more configurable trigger conditions include a current memory usage level exceeding a memory usage threshold and a level of confidence in the type prediction, and wherein the likely invalidity is dynamically detected by:
        collecting a number of calls to a function block in the code associated with the value profile that generates types of runtime values, the number of calls being based on a runtime status associated with a previous execution of the code;
        determining that the level of confidence in the type prediction that a future runtime value may belong to expected types associated with the value profile has fallen below a threshold value, based at least in part upon the number of calls to the function block in the code; and
        invalidating the code, based on the level of confidence falling below the threshold value;
    in response to invalidating the code, updating the code to replace the speculative optimization for the untyped variable with a nonoptimized access code compiled for the access to the untyped variable, based upon the likely invalidity; and
    executing the updated code without executing the optimized access code for the future runtime values of the untyped variable.

2. The medium of claim 1, wherein the detection comprises:
    identifying the types of the existing runtime values stored in the value profiles, wherein the type prediction is valid if at least one of the identified types belongs to the expected types.

3. The medium of claim 2, wherein an access code compiled without the speculative optimization is based on a collection of possible types of values for the untyped variable, and wherein the collection of possible types includes the expected types.

4. The medium of claim 2, wherein the source code specifies one or more functions, each function having zero or more input variables to update one or more variables, wherein the function represents a structure transition from a source collection of types to a target collection of types, and wherein each target type corresponds one of the updated variables based on the input variables belonging to the source collection of types, the detection further comprising:

identifying a sequence of one or more of the functions, wherein the types of the existing runtime values are transitively transitioned to a resulting collection of types via structure transitions in order corresponding to the sequence of functions, and wherein the type prediction is valid if at least one of the resulting collection of types belongs to the expected types.

5. The medium of claim 4, wherein the sequence of functions includes a first function and a second function next to the first function according to the sequence, the first function corresponding to a first structure transition, the second function corresponding to a second structure transition, wherein a first collection of types are transitively transitioned to a second collection of types via the first structure transition and the second structure transition in order, if the first collection of types is transitioned to an intermediate collection of types via the first structure transition and the intermediate collection of types is transitioned to the second collection of types via the second structure transition.

6. The medium of claim 4, wherein each existing runtime value corresponds to a runtime object, wherein the identification of the sequence of functions comprises:

determining if the one or more functions are invokable based on the existing runtime values, wherein a particular one of the functions is invokable, if a particular one of the existing runtime values corresponds to a particular runtime object including a pointer pointing to the particular function, wherein the particular function is invokable, if an invokable one of the functions specifies a call to the particular function, and wherein each of the sequence of functions is invokable.

7. The medium of claim 4, wherein the likely invalidity is detected if none of the identified types belongs to the expected types and no sequence of the functions is identified for a corresponding resulting collection of types with at least one of the corresponding resulting collection of types belonging to the expected types.

8. The medium of claim 1, wherein the value profiles are allocated in a heap memory and further comprising:

performing garbage collection operations to maintain the heap memory, wherein the detection of the likely invalidity of the type prediction, and the prediction of future runtime values of the untyped variable, is initiated via the garbage collection operations and the configurable trigger condition is based on an amount of available memory being less than a predetermined amount; and preemptively recompiling the previously compiled code without waiting for detection of actual failure of the speculative optimized code.

9. The medium of claim 1 further comprising:

profiling the execution of the code to store one or more types of the runtime values assigned to the untyped variable in the value profile.

10. The medium of claim 9, wherein the access of the untyped variable is specified in one of the functions, the one function having at least one input variable, and wherein the untyped variable belongs to the at least one input variable of the one function.

11. The medium of claim 10, wherein the code includes an optimally compiled function code for the one function optimized based on the type prediction, and wherein the optimally compiled function code includes the access to the untyped variable.

12. The medium of claim 11, wherein the updated code includes a non-optimized compiled function code for the one function without the optimally compiled function code.

13. The medium of claim 11, wherein the update comprises:

recompiling the code dynamically during the runtime to remove the optimally compiled function code for the one function.

14. The medium of claim 11, wherein a non-optimally compiled function code for the one function includes the access code, and wherein the recompilation replaces the optimally compiled function code with the non-optimally compiled function code for the one function.

15. The medium of claim 11, wherein the types of runtime values stored in the value profiles correspond to an updated type prediction for the future runtime values of the untyped variable, and wherein the recompilation replaces the optimally compiled function code with an updated compiled function code for the one function optimized based on the updated type prediction.

16. The medium of claim 1, wherein the one or more configurable trigger conditions further include detecting an increase in memory usage rate.

17. The medium of claim 1, wherein the level of confidence in the type prediction is further based, at least in part, on a rate of failure of the type prediction exceeding a configurable threshold value.

18. The medium of claim 1, further comprising performing a scheduled analysis of the value profile to determine likely invalidity of a predicted type, independent from the configurable trigger condition.

19. The medium of claim 1, wherein updating the code is performed independent of an actual failure of the optimized code.

20. The medium of claim 1, wherein a garbage collector calls a compilation module to determine whether a type prediction is likely to fail for future runtime values.

21. A machine-readable non-transitory storage medium having instructions therein, which when executed by a machine, cause the machine to perform a method, the method comprising:

executing a code compiled from a source code specifying at least one function having one or more untyped input variables, the code including a first function code optimally compiled for the function based on a type prediction for future runtime values of the untyped input variables, the type prediction deriving expected types for the future runtime values by sampling runtime values from value buckets of value profiles sporadically or stochastically, the type prediction initiated in response to a configurable trigger condition of one or more trigger conditions, wherein value profiles are allocated to store existing runtime values assigned to the untyped input variables, wherein at least one existing runtime value is stored in a value profile without a type;

detecting, dynamically, likely invalidity of the type prediction for one or more of the future runtime values of the untyped input variables is initiated in response to the one or more configurable trigger conditions, wherein the one or more configurable trigger conditions include a current memory usage level exceeding a memory usage threshold and a level of confidence in the type prediction, and wherein the likely invalidity is dynamically detected by;

collecting a number of calls to a function block in the code associated with the value profile that generates types of runtime values, the number of calls being based on a runtime status associated with a previous execution of the code;

determining that the level of confidence in the type prediction that a future runtime value may belong to expected types associated with the value profile has fallen below a threshold value, based at least in part upon the number of calls to a function block in the code; and invalidating the code, based on the level of confidence falling below the threshold value;

in response to invalidating the code, updating the code to replace the optimally compiled first function code with a second function code compiled without speculative optimization for the function, based upon the likely invalidity; and executing the updated code without executing the first function code for the future runtime values of the untyped input variables.

22. The medium of claim 21, wherein the value profiles are allocated in a heap memory as objects, the method further comprising:

performing garbage collection operations to maintain the heap memory, wherein the garbage collection operations identify which of the objects are no longer needed for the execution of the code, and wherein the garbage collection operations include a callback to initiate the detection of the likely invalidity, and the configurable trigger condition is an amount of available memory being less than a predetermined amount; and preemptively recompiling the previously compiled code without waiting for detection of actual failure of the speculative optimized code.

23. The medium of claim 21 further comprising:

identifying the types of the existing runtime values stored in a heap memory, wherein the types of the future runtime values include the types of the existing runtime values.

24. The medium of claim 21, wherein the code includes a plurality of function codes for a plurality of functions specified in the source code, wherein at least one of the function codes represents a structure transition indicating a destination type of the future runtime values based on a source type of the future runtime values, and wherein the types of the future runtime values include the destination type if the types of the future runtime values include the source type.

25. The medium of claim 24, wherein the objects in a heap memory include a pointer pointing to the at least one function code.

26. A computer implemented method comprising:

executing a code compiled from a source code, the source code including an access of an untyped variable, the access being compiled with speculative optimization as an optimized access code in the code via a type prediction of future runtime values of the untyped variable, the type prediction deriving expected types for the future runtime values by sampling runtime values from value buckets of value profiles sporadically or stochastically, the type prediction initiated in response to a configurable, and dynamically adjustable, trigger condition of one or more configurable and adjustable trigger conditions, wherein value. profiles are allocated to store existing runtime values assigned to the untyped variable, wherein at least one existing runtime value is stored in a value profile without a type;

detecting, dynamically, a likely invalidity of the type prediction for one or more of the future runtime values of the untyped variable is initiated in response to the one or more configurable trigger conditions, wherein the one or more configurable and adjustable trigger conditions include a current memory usage level exceeding a memory usage threshold and a level of confidence in the type prediction, and wherein the likely invalidity is dynamically detected by:

collecting a number of calls to a function block in the code associated with the value profile that generates types of runtime values, the number of calls being based on a runtime status associated with a previous execution of the code;

determining that the level of confidence in the type prediction that a future runtime value may belong to expected types associated with the value profile has fallen below a threshold value, based at least in part upon the number of calls to the function block in the code; and invalidating the code, based on the level of confidence falling below the threshold value;

in response to invalidating the code, updating the code to replace the speculative optimization for the untyped variable with a nonoptimized access code compiled for the access to the untyped variable based upon the likely invalidity; and executing the updated code without executing the optimized access code for the future runtime values of the untyped variable.

27. The method of claim 26, wherein the level of confidence in the type prediction that a future runtime value may belong to the expected types associated with the value profile for the untyped variable is further based, at least in part, on:

tracking a number of failures of a type prediction; and the one or more configurable trigger conditions including one or both of:

a number of failures of the type prediction exceeding a threshold value; or a rate of failures of the type prediction exceeding a threshold rate.

28. A computer system comprising:

a memory storing instructions and a source code, the source code including an access of an untyped variable for a data processing task;

a processor coupled to the memory and a user interface to execute the instructions from the memory, the processor being configured to:

execute a code compiled from a source code including an access of an untyped variable, the access being compiled with speculative optimization as an optimized access code in the code via a type prediction of future runtime values of the untyped variable, the type prediction deriving expected types for the future runtime values by sampling runtime values from value buckets of value profiles sporadically or stochastically, the type prediction initiated in response to a configurable trigger condition of one or more configurable trigger conditions, wherein value profiles are allocated to store existing runtime values assigned to the untyped variable, wherein at least one existing runtime value is stored in a value profile without a type;

detect, dynamically, a likely invalidity of the type prediction for one or more of the future runtime values of the untyped variable is initiated in response to the one or more configurable trigger conditions, wherein the one or more configurable trigger conditions include a current memory usage level exceeding a memory usage threshold and a level of confidence in the type prediction, and wherein the likely invalidity is dynamically detected by:

collecting a number of calls to a function block in the code associated with the value profile that generates types of runtime values, the number of calls being based on a runtime status associated with a previous execution of the code;

determining that the level of confidence in the type prediction that a future runtime value may belong to expected types associated with the value profile has fallen below a threshold value, based at least in part upon the number of calls to the function block in the code; and invalidating the code, based on the level of confidence falling below the threshold value; in response to invalidating the code, update the code to replace the speculative optimization for the untyped variable with a nonoptimized access code compiled for the access to the untyped variable based upon the likely invalidity; and execute the updated code without executing the optimized access code for the future runtime values of the untyped variable.

* * * * *